United States Patent
Aoki

(10) Patent No.: US 8,302,729 B2
(45) Date of Patent: Nov. 6, 2012

(54) ELECTRICAL POWER SUPPLY UNIT FOR VEHICLE

(75) Inventor: Kenichiro Aoki, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 117 days.

(21) Appl. No.: 12/981,968

(22) Filed: Dec. 30, 2010

(65) Prior Publication Data

US 2011/0094821 A1 Apr. 28, 2011

Related U.S. Application Data

(63) Continuation of application No. PCT/JP2008/068122, filed on Sep. 29, 2008.

(51) Int. Cl.
*B62D 5/04* (2006.01)
(52) U.S. Cl. ........................ 180/446; 180/443
(58) Field of Classification Search .............. 180/446, 180/443, 444
See application file for complete search history.

(56) References Cited

U.S. PATENT DOCUMENTS

| | | | | |
|---|---|---|---|---|
| 4,986,379 | A * | 1/1991 | Morishita | 180/446 |
| 5,475,289 | A * | 12/1995 | McLaughlin et al. | 318/432 |
| 2002/0020580 | A1* | 2/2002 | Mukai et al. | 180/446 |
| 2002/0097020 | A1* | 7/2002 | Ueno et al. | 318/783 |
| 2010/0193267 | A1* | 8/2010 | Nozawa | 180/65.1 |

FOREIGN PATENT DOCUMENTS

| | | |
|---|---|---|
| JP | 2007-91122 | 4/2007 |
| JP | 2007-153107 | 6/2007 |
| JP | 2008-149910 | 7/2008 |
| WO | WO 2007/066487 | 6/2007 |

OTHER PUBLICATIONS

International Search Report issued Dec. 22, 2008 in PCT/JP2008/068122 (with English Translation of categories).
International Written Opinion issued Dec. 22, 2008 in PCT/JP2008/068122.

* cited by examiner

*Primary Examiner* — Tashiana Adams
(74) *Attorney, Agent, or Firm* — Oblon, Spivak, McClelland, Maier & Neustadt, L.L.P.

(57) ABSTRACT

An electrical power supply unit for vehicle comprises: a Main Power Supply 100, a Voltage Converter 40 for converting the output voltage of the Main Power Supply 100 to supply electrical power to a Motor Drive Circuit 30, a Subsidiary Power Supply 50 to be charged by the Voltage Converter 40 and to aid the electrical power supply for the Motor Drive Circuit 30 with its stored electrical power, and an Electrical Power Supply Control Unit 62 to control the converted voltage of the Voltage Converter 40. The Electrical Power Supply Control Unit 62 controls the converted voltage of the Voltage Converter 40 based on the Voltage Converter Temperature Tb and the Subsidiary Power Supply Temperature Ts so that the heat generation condition of the Voltage Converter 40 and the heat generation condition of the Subsidiary Power Supply 50 are balanced. Thereby, the difference between the timing when a Voltage Converter Temperature Tb reaches an overheat prevention starting temperature and the timing when a Subsidiary Power Supply Temperature Ts reaches an overheat prevention starting temperature decreases, and the timing when an overheat prevention starts can be delayed as much as possible.

9 Claims, 9 Drawing Sheets

ELECTRICAL POWER SUPPLY UNIT FOR VEHICLE

CROSS-REFERENCE TO RELATED APPLICATIONS

This application is a continuation application of and claims the benefit of priority of PCT/JP2008/068122, filed Sep. 29, 2008, the entire contents of which are incorporated herein by reference.

TECHNICAL FIELD

The present invention relates to an electrical power supply unit for vehicle, which comprises a main power supply and a subsidiary power supply for being charged by the main power supply to aid electrical power supply for an electrical actuator.

BACKGROUND ART

Conventionally, for example, in an electrical power steering apparatus, the apparatus comprises an electrical motor for imparting steering assist torque in accordance with the turning operation of the steering wheel, and controls the power supply for the electrical motor to adjust the steering assist torque. Such an electrical power steering apparatus uses an in-vehicle battery, and consumes large electrical power. Therefore, for example, the apparatus proposed in Japanese Patent Application Laid-Open (kokai) No. 2007-91122 comprises a subsidiary power supply for aiding an in-vehicle battery. The subsidiary power supply has a configuration where the subsidiary power supply can be connected in parallel with an electrical power supply line from the in-vehicle battery (hereinafter, will be referred to as a "main power supply") to a motor drive circuit, be charged by the main power supply, and supply electrical power to the motor drive circuit by using its stored electrical power. In addition, this apparatus comprises a voltage converter, and converts the output voltage of the main power supply to supply electrical power to the motor drive circuit.

DISCLOSURE OF THE INVENTION

When such an electrical power supply system is configured, it is necessary to prevent overheat of a voltage converter and a subsidiary power supply. Accordingly, it can be supposed to incorporate an overheat prevention system for detecting the temperature of a voltage converter and the temperature of a subsidiary power supply and when any of the detected temperature exceeds an overheat prevention temperature, decreasing the upper limit of the electrical current (upper limit current) flowing through an electrical motor in accordance with the increase in the detected temperature. However, in some way of using the subsidiary power supply, the heat generation condition of the subsidiary power supply and the heat generation condition of the voltage converter may be unbalanced, and, while one of them has not yet generated much heat, the other may reach an overheat prevention starting temperature, and thus the power supply to the electrical motor may be limited at early stage, and enough steering assist may not be obtained.

For example, when steering operations with large fluctuation range of motor load are continued (e.g., when strong steering operations are intermittently repeated), the subsidiary power supply frequently repeats discharges (aids for electrical power supply for an electrical motor) and charges (charging of the electrical power supplied from a voltage converter). Therefore, the temperature of the subsidiary power supply reaches to the overheat prevention starting temperature earlier as compared with the temperature of the voltage converter. Accordingly, although the voltage converter has an enough temperature margin, the output limiting facility functions, and as a result, the electrical power supply capacity as a whole electrical power supply system cannot be effectively used.

The present invention has been conceived to address the above-described problems, and the purpose of the present invention is to sufficiently bring out the electrical power supply capacity.

In order to achieve the above purpose, a feature of the present invention is in that an electrical power supply unit for vehicle comprises:

a main power supply, a voltage converter for converting the output voltage of the main power supply to supply electrical power to an electrical actuator for vehicle, a subsidiary power supply, which is connected in parallel with said electrical actuator for vehicle to said voltage converter to be charged by said voltage converter and to aid the electrical power supply for said electrical actuator for vehicle by using its stored electrical power, a voltage converter temperature detection means for detecting the temperature of said voltage converter, a subsidiary power supply temperature detection means for detecting the temperature of said subsidiary power supply, an overheat prevention means for preventing the overheat of said voltage converter and said subsidiary power supply based on said detected temperature of said voltage converter and said detected temperature of said subsidiary power supply, a heat generation balance detection means for detecting the balance between the heat generation condition of said voltage converter and the heat generation condition of said subsidiary power supply based on said detected temperature of said voltage converter and said detected temperature of said subsidiary power supply, and a current control means for controlling the output current of said voltage converter and the charge discharge current flowing through said subsidiary power supply based on said detected balance between the heat generation conditions.

In the present invention, the output voltage of a main power supply is converted by a voltage converter, and the converted voltage is supplied to an electrical actuator for vehicle. A subsidiary power supply is connected to an electrical power supply circuit from the voltage converter to an electrical actuator in parallel with the circuit. The subsidiary power supply is charged by the voltage converter, and supplies its stored electrical power to the electrical actuator to aid the electrical power supply by the main power supply.

A voltage converter generates heat in accordance with the amount of an electrical current flowing therethrough. In addition, a subsidiary power supply also generates heat in accordance with the amounts of a charging current and a discharging current. For such heat generations, an overheat prevention means is included in order to protect the voltage converter and the subsidiary power supply. The overheat prevention means prevents the overheat of the voltage converter and the subsidiary power supply based on the temperature of the voltage converter detected by a voltage converter temperature detection means and the temperature of the subsidiary power supply detected by a subsidiary power supply temperature detection means. When preventing overheat, if the heat generation condition of the voltage converter and the heat generation condition of the subsidiary power supply are unbalanced, in some cases, although one of them has enough temperature margin, the other generates heat and earlier reaches the overheat prevention starting temperature. In such cases, the electrical power supply capacity of an electrical power supply unit cannot be effectively used.

Therefore, a heat generation balance detection means detects the balance between the heat generation condition of a voltage converter and the heat generation condition of a subsidiary power supply from the temperature of the voltage converter and the temperature of the subsidiary power supply, and a current control means controls the output current of the voltage converter and the charge discharge current flowing through the subsidiary power supply based on the balance between the heat generation conditions. Namely, the current control means controls the output current of the voltage converter and the charge discharge current flowing through the subsidiary power supply such that the heat generation condition of the voltage converter and the heat generation condition of the subsidiary power supply are balanced. Consequently, in accordance with the present invention, the unbalance between the heat generation condition of a voltage converter and the heat generation condition of a subsidiary power supply can be suppressed, and the difference between the timing when the temperature of the voltage converter reaches its overheat prevention starting temperature and the timing when the temperature of the subsidiary power supply reaches its overheat prevention starting temperature becomes smaller, and the timing when the overheat prevention starts can be delayed as much as possible. As a result, the electrical power supply capacity can be sufficiently brought out to supply an electrical power to an electrical actuator for vehicle.

Another feature of the present invention is in that said current control means controls the output current of said voltage converter and the charge discharge current flowing through said subsidiary power supply by adjusting the converted voltage of said voltage converter.

Since the subsidiary power supply is connected in parallel with the electrical actuator to the voltage converter, its charging and discharging are controlled in accordance with the converted voltage (output voltage) of the voltage converter. Namely, when the converted voltage is higher than the power supply voltage (output voltage) of the subsidiary power supply, electrical power supply for the electrical actuator and charging of the subsidiary power supply are done by the voltage converter, and when the converted voltage is lower than the power supply voltage (output voltage) of the subsidiary power supply, electrical power supply for the electrical actuator is done by discharging of the subsidiary power supply (emission of the charge stored in the subsidiary power supply). Then, in the present invention, the output current of a voltage converter and the charge discharge current flowing through a subsidiary power supply are controlled by adjusting the converted voltage of a voltage converter. Consequently, the balance between the heat generation condition of a voltage converter and the heat generation condition of a subsidiary power supply can be easily adjusted.

Another feature of the present invention is in that said heat generation balance detection means detects the balance between the heat generation condition of said voltage converter and the heat generation condition of said subsidiary power supply based on the magnitude correlation between the temperature margin degree of said voltage converter and the temperature margin degree of said subsidiary power supply.

In this case, said heat generation balance detection means may use the temperature obtained by subtracting the temperature detected by said voltage converter temperature detection means from the set allowable temperature of said voltage converter, as the temperature margin degree of said voltage converter, and it may use the temperature obtained by subtracting the temperature detected by said subsidiary power supply temperature detection means from the set allowable temperature of said subsidiary power supply, as the temperature margin degree of said subsidiary power supply.

In accordance with the present invention, since the balance between the heat generation condition of a voltage converter and the heat generation condition of a subsidiary power supply is detected from the magnitude correlation between the temperature margin degrees of them, the result of the detection becomes appropriate. When, for each of the voltage converter and the subsidiary power supply, the temperature obtained by subtracting the detected temperature from the set allowable temperature is used as the temperature margin degree, the temperature margin degrees can be easily obtained. The temperature margin degree is an index, which decreases as the condition gets closer to an overheat condition, and increases as the condition gets away more from an overheat condition.

Another feature of the present invention is in that said heat generation balance detection means judges the magnitude correlation between the temperature margin degree of said voltage converter and the temperature margin degree of said subsidiary power supply, based on the relation between the temperature width from the set ordinary temperature of said voltage converter to the set allowable temperature of said voltage converter and the temperature detected by said voltage converter temperature detection means, and the relation between the temperature width from the set ordinary temperature of said subsidiary power supply to the set allowable temperature of said subsidiary power supply and the temperature detected by said subsidiary power supply temperature detection means.

In many cases, the voltage converter and the subsidiary power supply have different temperature widths from the ordinary temperature (a temperature when not generating heat) to the set allowable temperature respectively. Therefore, in the present invention, the magnitude correlation between the temperature margin degree of a voltage converter and the temperature margin degree of a subsidiary power supply is judged based on the relation between the temperature width from the set ordinary temperature (set temperature determined as temperature when not generating heat) to the set allowable temperature and the actual temperature which is actually detected for each of the voltage converter and the subsidiary power supply.

For example, for each of the voltage converter and the subsidiary power supply, the ratio of the temperature margin from the detected temperature to the set allowable temperature, to the temperature width from the set ordinary temperature to the set allowable temperature ((set allowable temperature−detected temperature)/(set allowable temperature−set ordinary temperature)) is calculated as a temperature margin degree. Alternatively, for each of the voltage converter and the subsidiary power supply, the magnitude correlation between the temperature margin degree of the voltage converter and the temperature margin degree of the subsidiary power supply may be judged by calculating the ratio of the temperature elevation from the set ordinary temperature to the detected temperature, to the temperature width from the set ordinary temperature to the set allowable temperature ((detected temperature−set ordinary temperature)/(set allowable temperature−set ordinary temperature)). The ratio in the latter case relates to the temperature margin degree, and the smaller value the ratio becomes, the larger the temperature margin degree becomes. Thus, in accordance with the present invention, since the temperature width from the set ordinary temperature to the set allowable temperature is taken into account, the balance between the heat generation conditions can be further appropriately judged.

Another feature of the present invention is in that, in case where said detected balance between the heat generation conditions is out of a preset allowable balance range, said current control means suppresses both of charging and discharging of said subsidiary power supply when said temperature margin degree of said subsidiary power supply is smaller than said temperature margin degree of said voltage converter, while said current control means suppresses charging of said subsidiary power supply and accelerates discharging thereof when said temperature margin degree of said voltage converter is smaller than said temperature margin degree of said subsidiary power supply.

In the present invention, in case where the balance between the heat generation conditions is out of a preset allowable balance range and the temperature margin degree of said subsidiary power supply is smaller than the temperature margin degree of said voltage converter, both of charging and discharging of the subsidiary power supply are suppressed as compared with the case where the balance between the heat generation conditions is within a preset allowable balance range. On the other hand, when the temperature margin degree of the voltage converter is smaller than the temperature margin degree of the subsidiary power supply, charging of the subsidiary power supply is suppressed and discharging thereof is accelerated as compared with the case where the balance between the heat generation conditions is within the preset allowable balance range. Consequently, the aid for the electrical power supply for the electrical actuator by the subsidiary power supply is accelerated to decrease the burden of the voltage converter, and the heat generation of the voltage converter is decreased. However, the more heat generation of one of them is suppressed, the more the heat generation of the other is increased. As a result, the temperature margin degrees of the subsidiary power supply and the voltage converter come close to each other and good balance between the heat generation conditions of the voltage converter and the heat generation condition of the subsidiary power supply can be maintained.

Another feature of the present invention is in that said electrical power supply unit comprises:

an actuator current detection means for detecting the drive current of said electrical actuator, and a converted current detection means for detecting the output current of said voltage converter;

in case where said detected balance between the heat generation conditions is within a preset allowable balance range, said current control means sets the target output current of said voltage converter at the first current, and, in case where said detected balance between the heat generation conditions is out of said allowable balance range and the temperature margin degree of said subsidiary power supply is smaller than the temperature margin degree of said voltage converter, said current control means sets the target output current of said voltage converter at the same value as the drive current value of said electrical actuator when said drive current falls between the second current, which is larger than said first current, and the third current, which is smaller than said first current, and sets the target output current of said voltage converter at said second current when said drive current value is larger than said second current, and sets the target output current of said voltage converter at said third current when said drive current value is smaller than said third current, and in case where said detected balance between the heat generation conditions is out of said allowable balance range and the temperature margin degree of said voltage converter is smaller than the temperature margin degree of said subsidiary power supply, said current control means sets the target output current of said voltage converter at the fourth current, which is smaller than said first current, and;

said current control means adjusts the converted voltage of said voltage converter so that said detected output current of the voltage converter is equal to said set target output current of the voltage converter.

In the present invention, the current control means sets the target output current of the voltage converter in accordance with the balance between the heat generation conditions, and adjusts the converted voltage of the voltage converter so that the output current of the voltage converter detected by the converted current detection means is equal to the target output current. When the balance between the heat generation conditions is within a preset allowable balance range, the target output current of the voltage converter is set at the first current. Accordingly, when the drive current of the electrical actuator (electrical current supplied to the drive circuit of the electrical actuator) is larger than the first current, the shortfall flows from the subsidiary power supply to the electrical actuator, and when the drive current of the electrical actuator is smaller than the first current, the surplus flows to the subsidiary power supply as a charging current.

When the balance between the heat generation conditions is out of the allowable balance range and the temperature margin degree of the subsidiary power supply is smaller than the temperature margin degree of the voltage converter, the target output current of the voltage converter is set in accordance with the drive current of the electrical actuator. In this case, when the drive current value of the electrical actuator falls between the second current, which is larger than the first current, and the third current, which is smaller than the first current, the target output current of the voltage converter is set at the same value as the drive current value. Accordingly, neither a charging current nor a discharging current flow to the subsidiary power supply. Thereby, the heat generation of the subsidiary power supply is suppressed.

In addition, when the drive current value of the electrical actuator is larger than the second current, the target output current of the voltage converter is set at the second current. Accordingly, the excess of the drive current of the electrical actuator over the second current flows from the subsidiary power supply to the electrical actuator. Since the second current is set at an electrical current value, which is larger than the first current, the discharging current from the subsidiary power supply becomes smaller as compared with that in case where the balance between the heat generation conditions is within an allowable balance range. Thereby, the heat generation of the subsidiary power supply is suppressed.

In addition, when the drive current value of the electrical actuator is smaller than the third current, the target output current of the voltage converter is set at the third current. Accordingly, when the drive current of the electrical actuator is smaller than the third current, the surplus flows to the subsidiary power supply as a charging current. Since the third current is set at an electrical current value, which is smaller than the first current, the charging current to the subsidiary power supply becomes smaller as compared with that in case where the balance between the heat generation conditions is within an allowable balance range. Thereby, the heat generation of the subsidiary power supply is suppressed.

On the other hand, when the balance between the heat generation conditions is out of the allowable balance range and the temperature margin degree of the voltage converter is smaller than the temperature margin degree of the subsidiary power supply, the target output current of the voltage converter is set at the fourth current, which is smaller than the first current. Accordingly, when the drive current of the electrical actuator is larger than the fourth current, the shortfall flows from the subsidiary power supply to the electrical actuator, and when the drive current of the electrical actuator is smaller than the fourth current, the surplus flows to the subsidiary power supply as a charging current. Since the fourth current is set at an electrical current value, which is smaller than the first current, the drive current supplied from the voltage converter to the electrical actuator and the charging current to the subsidiary power supply become smaller as compared with that in case where the balance between the heat generation conditions is within an allowable balance range. Thereby, the heat generation of the subsidiary power supply is suppressed. In this case, the discharging from the subsidiary power supply to the electrical actuator is accelerated.

Thus, in accordance with the present invention, since a good balance between the heat generation condition of the voltage converter and the heat generation condition of the subsidiary power supply can be maintained, the electrical power supply capacity of the electrical power supply unit can be sufficiently brought out.

The actuator current detection means for detecting the drive current of said electrical actuator is not limited to those which directly detect the electrical current flowing through the drive circuit of the electrical actuator, and may detect the electrical current by detecting the output current of the voltage converter and the charge discharge current flowing through the subsidiary power supply and then adding the discharging current to the output current of the voltage converter or subtracting the charging current from the output current of the voltage converter. Also, the converted current detection means for detecting the output current of the voltage converter is not limited to those which directly detect the electrical current flowing through the voltage converter, and may detect the electrical current by detecting the drive current of the electrical actuator and the charge discharge current flowing through the subsidiary power supply and then adding the charging current to the drive current or subtracting the discharging current from the drive current.

Another feature of the present invention is in that said overheat prevention means decreases the upper limit current, which is the upper limit of the drive current of said electrical actuator in accordance with the increase in the detected temperature when one of the detected temperatures of said voltage converter and said subsidiary power supply exceeds the overheat prevention temperature.

In the present invention, when one of the detected temperatures of the voltage converter and the subsidiary power supply exceeds the respectively set overheat prevention temperature, the upper limit of the drive current to the electrical actuator is decreased in accordance with the increase in the detected temperature. Therefore, the electrical power supply from the voltage converter and the subsidiary power supply to the electrical actuator is limited in accordance with the heat generation conditions, and thereby overheat of the voltage converter and the subsidiary power supply can be appropriately prevented.

Another feature of the present invention is in that said electrical actuator is an electrical motor to impart steering force to wheels in accordance with a steering operation by a driver.

The present invention is to be applied to electrical power supply units used for electrical power steering apparatuses for imparting steering force to wheels in accordance with the steering operation of a driver. The present invention can be applied to electrical power steering apparatuses including electrical power steering apparatuses for adding auxiliary steering force by an electrical motor to the steering operation force of a driver, or steer-by-wire type steering apparatuses for steering wheels only by force of an electrical motor by decoupling a steering wheel and a wheel steering shaft.

In such electrical power steering apparatuses, an electrical motor consumes large electrical power. Then, in the present invention, a voltage converter and a subsidiary power supply charged by the voltage converter are included so that the subsidiary power supply can aid electrical power supply when an electrical motor consumes large electrical power. A voltage converter and a subsidiary power supply generate hest especially when an electrical motor consumes large electrical power. Even in such a case, in accordance with the present invention, since good balance between the heat generation conditions of both of them can be maintained, the electrical power supply capacity of an electrical power supply unit can be sufficiently brought out. As a result, even when steering operations are repeated, good steering performance can be maintained for a long period.

BEST MODE FOR CARRYING OUT THE INVENTION

Figure 1:
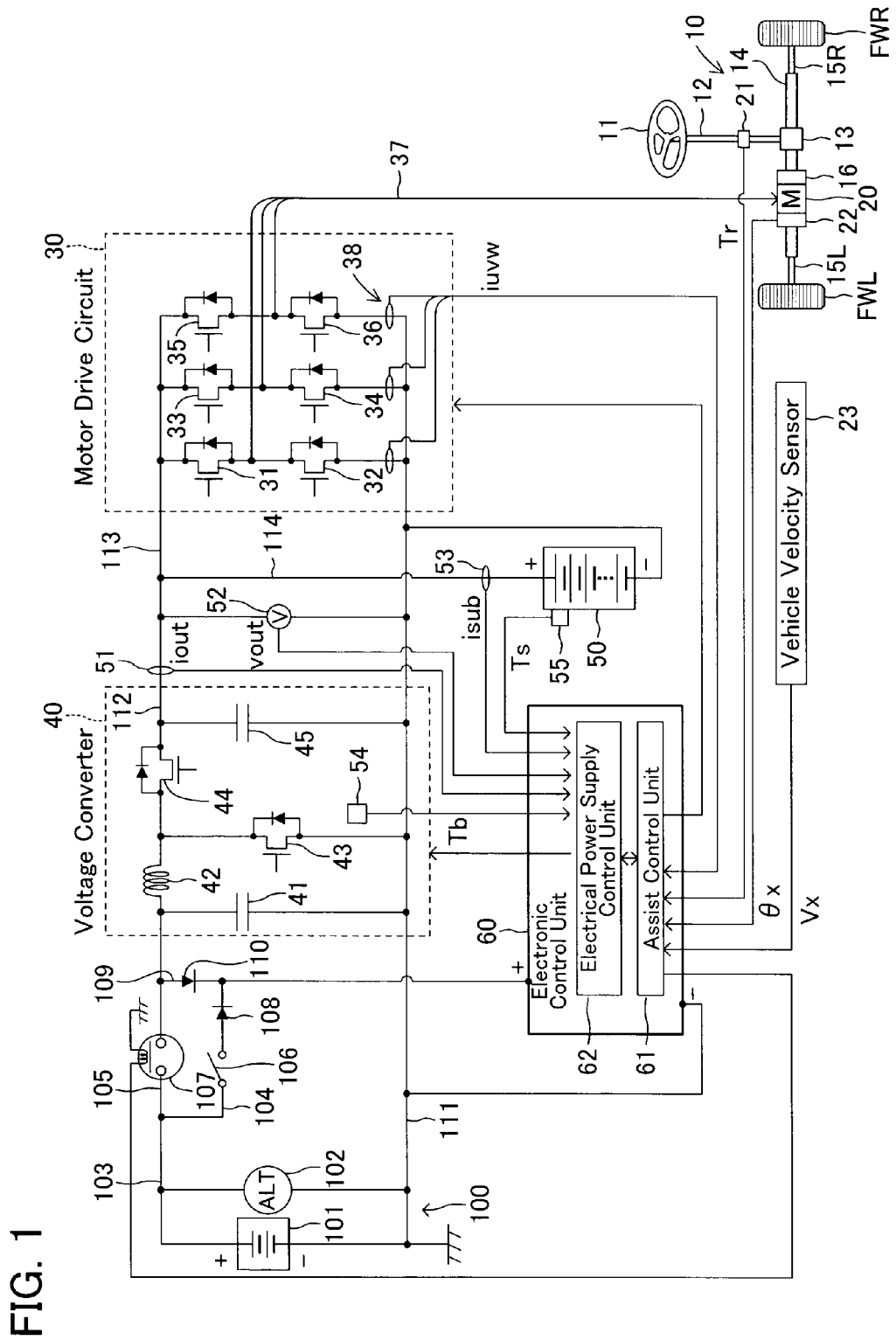
FIG. 1 is a schematic diagram of an electrical power steering apparatus comprising an electrical power supply unit according to the present invention.

Referring to the drawings, an electrical power supply unit for vehicle according to one embodiment of the present invention will be described hereinafter. FIG. 1 shows a schematic configuration of an electrical power steering apparatus comprising an electrical power supply unit for vehicle as the present embodiment.

The electrical power steering apparatus comprises as major parts a Steering Mechanism 10 to steer a steering shaft by the steering operation of a Steering Handle 11, an Electrical Motor 20 assembled to the Steering Mechanism 10 to generate a steering assist torque, a Motor Drive Circuit 30 for driving the Electrical Motor 20, a Voltage Converter 40 to convert the output voltage of a Main Power Supply 100 to supply electrical power to the Motor Drive Circuit 30, a Subsidiary Power Supply 50 connected in parallel with the electrical power supply circuit between the Voltage Converter 40 and the Motor Drive Circuit 30, and an Electronic Control Unit 60 to control the actions of the Electrical Motor 20 and the Voltage Converter 40.

The Steering Mechanism 10 comprises a Steering Shaft 12 with the Steering Handle 11 connected on its upper end so that the Steering Handle 11 rotates integrally with the Steering Shaft 12. At the lower end of the Steering Shaft 12, a Pinion Gear 13 is connected so that it rotates integrally therewith. The Pinion Gear 13 meshes with the rack teeth formed on a Rack Bar 14 to constitute a rack and pinion mechanism along with the Rack Bar 14. At the both ends of the Rack Bar 14, knuckles (not shown) of Left and Right Front Wheels FWL, FWR are connected in a steerable manner via a Tie Rods 15L, 15R. The Left and Right Front Wheels FWL, FWR are steered right and left in accordance with the displacement in the axis line direction of the Rack Bar 14 with the rotation of the Steering Shaft 12 around its axis line.

To the Rack Bar 14, the Electrical Motor 20 for steering assist is assembled. The rotation axis of the Electrical Motor 20 is connected with the Rack Bar 14 in a power transmittable manner via a Ball Screw Mechanism 16, and imparts steering force to the Left and Right Front Wheels FWL, FWR through its rotation to assist a steering operation. The Ball Screw Mechanism 16 functions as reduction gears and a rotation-linear motion converter, and reduces the revolution of the Electrical Motor 20 and converts the revolution to a linear motion and transmits the linear motion to the Rack Bar 14.

On the Steering Shaft 12, a Steering Torque Sensor 21 is disposed. The Steering Torque Sensor 21 outputs a signal corresponding to the steering torque acting on the Steering Shaft 12 by the rotating operation of the Steering Handle 11. The value of the steering torque detected through the signal output from the Steering Torque Sensor 21 will be hereinafter referred to as a Steering Torque Tr. The direction of the operation of the Steering Handle 11 is distinguished based on whether the Steering Torque Tr value is positive or negative. In the present embodiment, the Steering Torque Tr on steering the Steering Handle 11 to the right direction is represented as a positive value, and the Steering Torque Tr on steering the Steering Handle 11 to the left direction is represented as a negative value. Accordingly, the magnitude of the Steering Torque Tr comes to the absolute figure thereof.

In the Electrical Motor 20, a Rotation Angle Sensor 22 is disposed. Rotation Angle Sensor 22 is disposed within the Electrical Motor 20, and outputs a detection signal corresponding to the rotation angular position of a rotor of the Electrical Motor 20. The detection signal of the Rotation Angle Sensor 22 is utilized to calculate the rotation angle and rotation angular velocity of the Electrical Motor 20. On the other hand, since the rotation angle of the Electrical Motor 20 is proportional to the steering angle of the Steering Handle 11, it is commonly used also as the steering angle of the Steering Handle 11. In addition, since the rotation angular velocity, which is the derivative of the rotation angle of the Electrical Motor 20 with respect to time, is proportional to the steering angular velocity of the Steering Handle 11, it is commonly used also as the steering velocity of the Steering Handle 11. Hereinafter, the value of the steering angle of the Steering Handle 11 detected through the output signal of the Rotation Angle Sensor 22 will be referred to as a Steering Angle $\theta x$, and the value of the steering angular velocity obtained by differentiating the Steering Angle $\theta x$ with respect to time is referred to as a Steering Velocity $\omega x$. The positive and negative values of the Steering Angle $\theta x$ represent steering angles to the right direction and left direction, respectively, from the neutral position of the Steering Handle 11. In the present embodiment, the neutral position of the Steering Handle 11 is represented as "0" and the steering angle to the right direction from the neutral position is represented as a positive value and the steering angle to the left direction from the neutral position is represented as a negative value.

The Motor Drive Circuit 30 has a configuration where 6 Switching Elements 31 to 36 consisting of MOS-FET (Metal Oxide Semiconductor Field Transistor) constitute a three-phase inverter circuit. Specifically, it adopts a configuration where a circuit wherein the first Switching Element 31 and the second Switching Element 32 are series-connected, a circuit wherein the third Switching Element 33 and the fourth Switching Element 34 are series-connected, and a circuit wherein the fifth Switching Element 35 and the sixth Switching Element 36 are series-connected, are connected in parallel, and a Electrical Power Supply Line 37 to the Electrical Motor 20 gets out from between the two switching elements (31-32, 33-34, 35-36) in each of the series circuits.

In the Motor Drive Circuit 30, a Current Sensor 38 to detect the electrical current flowing through the Electrical Motor 20 is disposed. The Current Sensor 38 respectively detects the electrical current flowing through each of the phases, and outputs a detection signal corresponding to the value of the detected electrical currents to the Electronic Control Unit 60. Hereinafter, the value of the measured electrical currents will be referred to as a Motor Current iuvw, and the Current Sensor 38 is referred to as a Motor Current Sensor 38. Also, the electrical current input to the Motor Drive Circuit 30 (drive current) can be obtained by a calculation of the three-phase Motor Current iuvw. The electrical current input to the Motor Drive Circuit 30 is referred to as a Drive Current im.

In each of the Switching Elements 31 to 36, a gate is connected to an Assist Control Unit 61 (will be described later) of the Electronic Control Unit 60, and the duty ratio is controlled through a PWM control signal from the Assist Control Unit 61. Thereby, the drive voltage of the Electrical Motor 20 is adjusted to a target voltage. In addition, as shown in the drawing, each of the MOS-FETs' constituting the Switching Elements 31 to 36 has a diode parasitizing therein for structural reason.

Next, the electrical power supply system of the electrical power steering apparatus will be described.

The electrical power supply unit of the electrical power steering apparatus comprises the Main Power Supply 100, the Voltage Converter 40 to convert the output voltage of the Main Power Supply 100, the Subsidiary Power Supply 50 connected in parallel between the Voltage Converter 40 and the Motor Drive Circuit 30, and an Electrical Power Supply Control Unit 62 to control the converted voltage of the Voltage Converter 40 deposited in the Electronic Control Unit 60.

The Main Power Supply 100 has a configuration where a Main Battery 101, which is a standard in-vehicle battery with a rated output voltage of 12 V, and an Alternator 102 with a rated output voltage of 14 V, which generates electrical power by the revolution of an engine are connected in parallel. Consequently, the Main Power Supply 100 constitutes a 14 V-type in-vehicle battery.

The Main Power Supply 100 commonly supplies electrical power not only to an electrical power steering apparatus, but also to other in-vehicle electrical loads such as a headlight. An Electrical Power Supply Source Line 103 is connected to the power terminal (positive terminal) of the Main Battery 101, and a Ground Line 111 is connected to the ground terminal thereof.

The Electrical Power Supply Source Line 103 branches to a Control-system Electrical Power Line 104 and a Drive-system Electrical Power Line 105. The Control-system Electrical Power Line 104 functions as a power supply line for supplying electrical power only to the Electronic Control Unit 60. The Drive-system Electrical Power Line 105 functions as a power supply line for supplying electrical power to both of the Motor Drive Circuit 30 and the Electronic Control Unit 60.

To the Control-system Electrical Power Line 104, an Ignition Switch 106 is connected. To the Drive-system Electrical Power Line 105, an Electrical Power Supply Relay 107 is connected. The Electrical Power Supply Relay 107 is turned on through a control signal from the Assist Control Unit 61 of the Electronic Control Unit 60 to form an electrical power supply circuit to the Electrical Motor 20. The Control-system Electrical Power Line 104 is connected to the power terminal (positive terminal) of the Electronic Control Unit 60, and comprises a Diode 108 at a position thereon closer to the load side (the Electronic Control Unit 60 side) than the Ignition Switch 106. The Diode 108 is disposed with its cathode facing the Electronic Control Unit 60 and its anode facing the Main Power Supply 100, and is a backflow prevention element which enables the power supply only in the electrical power supply direction.

On the Drive-system Electrical Power Line 105, a Link Line 109 branches and is disposed at a position closer to the load side than the Electrical Power Supply Relay 107. The Link Line 109 is connected at a position closer to the Electronic Control Unit 60 side than the connection position of the Diode 108 on the Control-system Electrical Power Line 104. In addition, to the Link Line 109, a Diode 110 is connected. The Diode 110 is disposed with its cathode facing the Control-system Electrical Power Line 104 and its anode facing the Drive-system Electrical Power Line 105. Accordingly, it has a circuit configuration where electrical power can be supplied from the Drive-system Electrical Power Line 105 to the Control-system Electrical Power Line 104 via the Link Line 109, but electrical power cannot be supplied from the Control-system Electrical Power Line 104 to the Drive-system Electrical Power Line 105. The Drive-system Electrical Power Line 105 and the Ground Line 111 are connected to the Voltage Converter 40. In addition, the Ground Line 111 is also connected to the ground terminal of the Electronic Control Unit 60, as well.

The Voltage Converter 40 consists of a Condenser 41 deposited between the Drive-system Electrical Power Line 105 and the Ground Line 111, a Voltage Converting Coil 42 series-connected in the Drive-system Electrical Power Line 105 closer to the load side than the connection point of the Condenser 41, the First Voltage Converting Switching Element 43 deposited between the Drive-system Electrical Power Line 105 at load side of the Voltage Converting Coil 42 and the Ground Line 111, the Second Voltage Converting Switching Element 44 series-connected in the Drive-system Electrical Power Line 105 closer to the load side than the connection point of the First Voltage Converting Switching Element 43, and a Condenser 45 deposited between the Drive-system Electrical Power Line 105 at load side of the Second Voltage Converting Switching Element 44 and the Ground Line 111. To the secondary side of the Voltage Converter 40, a Converted Electrical Power Line 112 is connected.

Although MOS-FETs' are used as the Voltage Converting Switching Elements 43 and 44 in the present embodiment, other switching elements can be used. In addition, as shown by the circuit symbol in the drawing, each of the MOS-FETs' constituting the Voltage Converting Switching Elements 43 and 44 has a diode parasitizing therein for structural reason.

The voltage conversion by the Voltage Converter 40 is controlled by the Electrical Power Supply Control Unit 62 of the Electronic Control Unit 60. The Electrical Power Supply Control Unit 62 outputs a pulse signal with a predetermined period to the gates of the First and Second Voltage Converting Switching Elements 43 and 44 to turn on and off both of the Switching Elements 43 and 44, and converts the electrical power supplied from the Main Power Supply 100 to generate a predetermined output voltage at the Converted Electrical Power Line 112. In this case, the First and Second Voltage Converting Switching Elements 43 and 44 are controlled so that they are turned on and off oppositely with each other. The Voltage Converter 40 operates so that it turns on the First Voltage Converting Switching Element 43 and turns off the Second Voltage Converting Switching Element 44 and flows electrical current through the Voltage Converting Coil 42 to store electrical power in the Voltage Converting Coil 42, and immediately thereafter it turns off the First Voltage Converting Switching Element 43 and turns on the Second Voltage Converting Switching Element 44 and outputs the electrical power stored in the Voltage Converting Coil 42.

The output voltage of the Second Voltage Converting Switching Elements 44 is smoothed by the Condenser 45. Accordingly, stable converted electrical power is output from the Converted Electrical Power Line 112. In this case, plural condensers with different frequency characteristics may be connected in parallel to improve the smoothing property. In addition, the Condenser 41 removes noises to the Main Power Supply 100.

The converted voltage (output voltage) of the Voltage Converter 40 is adjustable by controlling the duty ratio of the First and Second Voltage Converting Switching Elements 43 and 44 (PWM control). The Voltage Converter 40 in the present embodiment is configured so that it can adjust the output voltage, for example, within the range from 20 V to 50 V. As the Voltage Converter 40, general-purpose DC-DC converters can be used.

The Converted Electrical Power Line 112 branches to a Converted Drive Line 113 and a Charge Discharge Line 114. The Converted Drive Line 113 is connected to the power input portion of the Motor Drive Circuit 30. The Charge Discharge Line 114 is connected to the positive terminal of the Subsidiary Power Supply 50.

The Subsidiary Power Supply 50 is an electrical storage device which is charged with the output power of the Voltage Converter 40, and supplies its stored electrical power to the Motor Drive Circuit 30 to assist the Main Power Supply 100 when large electrical power is needed at the Motor Drive Circuit 30. Accordingly, the Subsidiary Power Supply 50 is configured by connecting plural storage cells in series so that a voltage corresponding to the converted voltage of the Voltage Converter 40. The ground terminal of the Subsidiary Power Supply 50 is connected to the Ground Line 111. As the Subsidiary Power Supply 50, for example, capacitors (electrical double layer capacitors) can be used.

On the output side of the Voltage Converter 40, a Current Sensor 51 and a Voltage Sensor 52 are disposed. The Current Sensor 51 detects the electrical current flowing through the Converted Electrical Power Line 112, i.e. the output current of the Voltage Converter 40, and outputs a signal corresponding to the detected value thereof to the Electrical Power Supply Control Unit 62. In addition, the Voltage Sensor 52 detects the voltage between the Converted Electrical Power Line 112 and the Ground Line 111, i.e. the converted voltage of the Voltage Converter, and outputs a signal corresponding to the detected value thereof to the Electrical Power Supply Control Unit 62. Hereinafter, the Current Sensor 51 will be referred to as a Converted Current Sensor 51, and the detected value of the electrical current is referred to as a Converted Current iout. Also, the Voltage Sensor 52 is referred to as a Converted Voltage Sensor 52, and the detected value of the voltage is referred to as a Converted Voltage vout. The Converted Current Sensor 51 corresponds to the converted current detection means according to the present invention.

In the Voltage Converter 40, a Temperature Sensor 54 for detecting the heat generation condition of the Voltage Converter 40 is disposed. The Temperature Sensor 54 is attached on an element likely to reach an overheat condition due to the electrical current flowing therethrough earliest among the elements in the Voltage Converter 40 to detect the temperature of the element. For example, it is disposed on the First Voltage Converting Switching Element 43, the Second Voltage Converting Switching Element 44, or the like. The Temperature Sensor 54 outputs a signal corresponding to the detected temperature to the Electrical Power Supply Control Unit 62. Hereinafter, the Temperature Sensor 54 will be referred to as a Voltage Converter Temperature Sensor 54, and the temperature detected by the Voltage Converter Temperature Sensor 54 is referred to as a Voltage Converter Temperature Tb. The method for detecting the temperature of the Voltage Converter 40 is not limited to those in which temperature is directly detected by a temperature sensor, and may be those in which the temperature is indirectly detected by utilizing an estimate value calculated based on an electrical current flowing through a circuit element. The Voltage Converter Temperature Sensor 54 corresponds to the voltage converter temperature detection means according to the present invention.

In addition, on the Charge Discharge Line 114, a Current Sensor 53 is disposed. The Current Sensor 53 detects the electrical current flowing through the Charge Discharge Line 114, i.e. the charge discharge current flowing through the Subsidiary Power Supply 50, and outputs a signal corresponding to the detected value thereof to the Electrical Power Supply Control Unit 62. The Current Sensor 53 distinguishes the direction of the electrical current, namely distinguishes the charge current flowing from the Voltage Converter 40 to the Subsidiary Power Supply 50 and the discharge current flowing from the Subsidiary Power Supply 50 to the Motor Drive Circuit 30, and detects the magnitude thereof. Hereinafter, the Current Sensor 53 will be referred to as a Charge Discharge Current Sensor 53, and the value of the detected electrical current is referred to as a Charge Discharge Current isub. When identifying the flow direction of the electrical current, it is referred to as a Charge Current isub or a Discharge Current isub.

The better the charging status is (the more the amount of stored charge is), the higher the output voltage of the Subsidiary Power Supply 50 becomes. Although electrical power is supplied from the Voltage Converter 40 to the Motor Drive Circuit 30 when the Electrical Motor 20 is driven by a steering assist control which will be described later, the output voltage of the Voltage Converter 40 decreases when the electrical power used by the Electrical Motor 20 increases beyond the rated output of the Voltage Converter. Thereby, the output voltage of the Subsidiary Power Supply 50 exceeds the output voltage of the Voltage Converter 40, and then electrical power is supplied from the Subsidiary Power Supply 50 to the Electrical Motor 20. Thus, electrical power is supplied from the Subsidiary Power Supply 50 to the Electrical Motor 20 to compensate the temporary shortfall of the output of the Voltage Converter 40. In a situation where the electricity consumption in the Electrical Motor 20 and the Subsidiary Power Supply 50 has not been fully charged, the Subsidiary Power Supply 50 is charged by the output of the Voltage Converter 40.

The Subsidiary Power Supply 50 generates heat through charging and discharging. Especially, when strong steering operations are frequently repeated, the fluctuation range of the load of the Electrical Motor 20 increases and the charging and discharging of the Subsidiary Power Supply 50 are frequently repeated, and therefore the amount of heat generation thereof increases. Accordingly, on the Subsidiary Power Supply 50, a Temperature Sensor 55 is disposed in order to detect its heat generation condition. The Temperature Sensor 55 is disposed by, for example, being attached on the casing of the Subsidiary Power Supply 50, and outputs a signal corresponding to the detected temperature. Hereinafter, the Temperature Sensor 55 will be referred to as a Subsidiary Power Supply Temperature Sensor 55, and the temperature detected by the Subsidiary Power Supply Temperature Sensor 55 is referred to as a Subsidiary Power Supply Temperature Ts. The method for detecting the temperature of the Subsidiary Power Supply 50 is not limited to those in which temperature is directly detected by a temperature sensor, and may be those in which the temperature is indirectly detected by utilizing an estimate value calculated based on an electrical current flowing through the Subsidiary Power Supply 50. The Subsidiary Power Supply Temperature Sensor 55 corresponds to the subsidiary power supply temperature detection means according to the present invention.

Next, the Electronic Control Unit 60 will be described. The Electronic Control Unit 60 is configured so as to comprise as a major part a microcomputer consisting of CPU, ROM, RAM and the like, and, from the viewpoint of functions, is roughly classified into an Assist Control Unit 61 and an Electrical Power Supply Control Unit 62. The Assist Control Unit 61 is connected with a Steering Torque Sensor 21, a Rotation Angle Sensor 22, a Motor Current Sensor 38, and a Vehicle Velocity Sensor 23, and inputs thereto sensor signals representing a Steering Torque Tr, a Steering Angle θx, a Motor Current iuvw, and a Vehicle Velocity Vx, respectively. The Assist Control Unit 61 is configured so as to be able to mutually send and receive a signal to and from the Electrical Power Supply Control Unit 62, and, based on the sensor signals and information from the Electrical Power Supply Control Unit 62, outputs a PWM control signal to the Motor Drive Circuit 30 to control the driving of the Electrical Motor 20 and assist the steering operation of a driver.

The Electrical Power Supply Control Unit 62 controls the charging and discharging of the Subsidiary Power Supply 50 by controlling the voltage conversion of the Voltage Converter 40. The Electrical Power Supply Control Unit 62 is connected with a Converted Current Sensor 51, a Converted Voltage Sensor 52, a Voltage Converter Temperature Sensor 54, a Charge Discharge Current Sensor 53, and a Subsidiary Power Supply Temperature Sensor 55, and inputs thereto sensor signals representing a Converted Current iout, a Converted Voltage vout, a Voltage Converter Temperature Tb, a Charge Discharge Current isub, and a Subsidiary Power Supply Temperature Ts, respectively. The Electrical Power Supply Control Unit 62 outputs a PWM control signal to the Voltage Converter 40 based on the sensor signals and information from the Assist Control Unit 61. The Voltage Converter 40 changes the converted voltage, which is the output voltage thereof, by controlling the duty ratio of the First and Second Voltage Converting Switching Elements 43 and 44 in accordance with the input PWM control signal.

Figure 2:
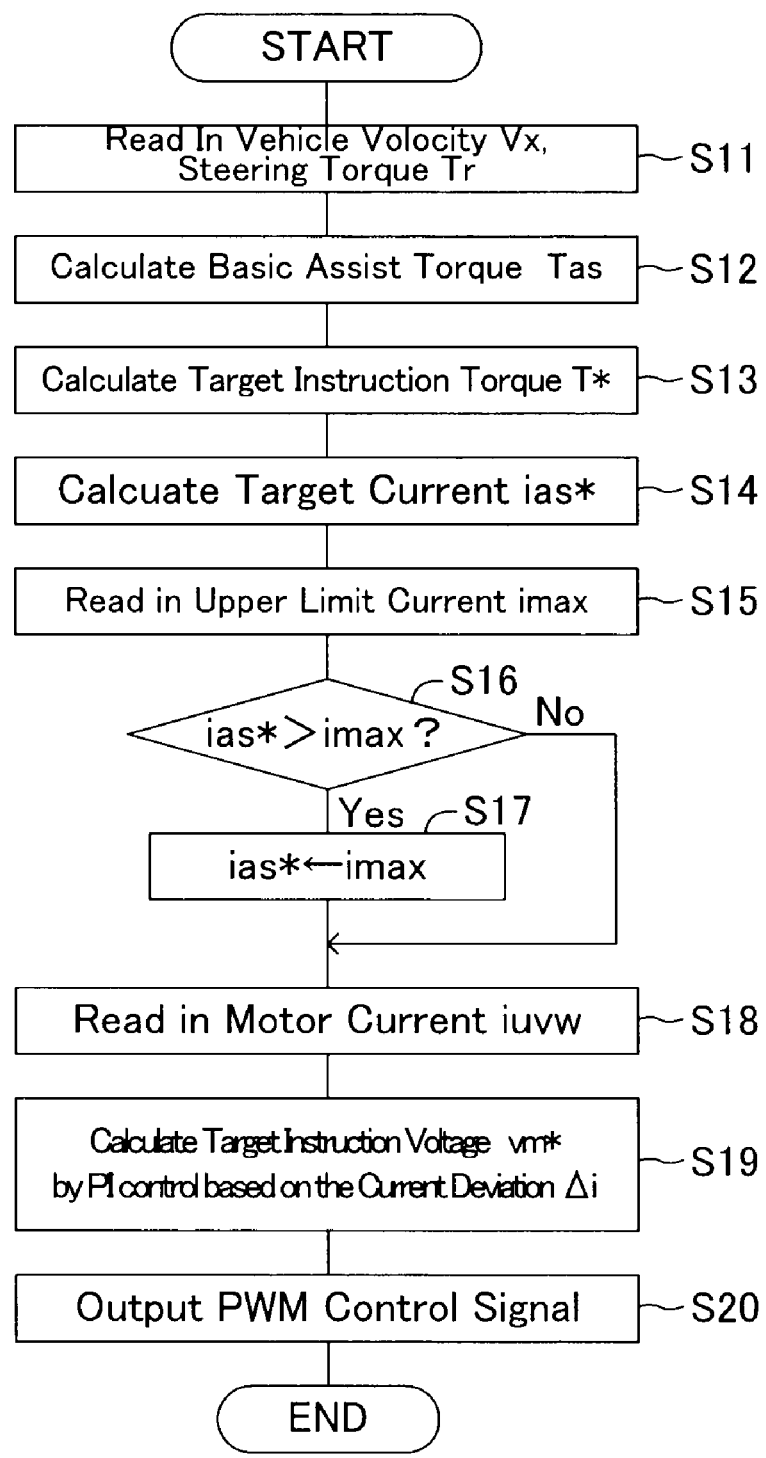
FIG. 2 is a flow chart showing a steering assist control routine.

Next, the steering assist control process performed by the Assist Control Unit 61 of the Electronic Control Unit 60 will be described. FIG. 2 shows a steering assist control routine performed by the Assist Control Unit 61. The steering assist control routine is stored as a control program in an ROM of the Electronic Control Unit 60, is started up by turning on an Ignition Switch 106, and is repeatedly executed in a predetermined short cycle.

Once the control routine starts up, the Assist Control Unit 61 first reads in a Vehicle Velocity Vx detected by the Vehicle Velocity Sensor 23 and a Steering Torque Tr detected by the Steering Torque Sensor 21 in Step S11.

Figure 3:
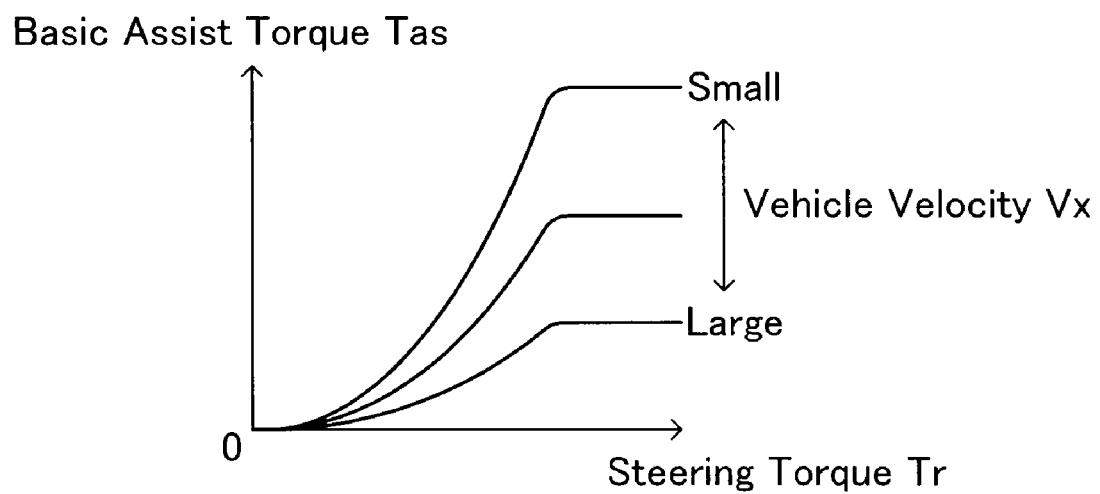
FIG. 3 is a characteristic diagram showing an assist torque map.

Subsequently, in Step S12, referring to an assist torque map shown in FIG. 3, a Basic Assist Torque Tas set in accordance with the input Vehicle Velocity Vx and Steering Torque Tr is calculated. The assist torque map is stored in the ROM of the Electronic Control Unit 60, wherein the Basic Assist Torque Tas is set so that it increases according to the increase of the Steering Torque Tr and the lower the Vehicle Velocity Vx becomes, the larger the value thereof becomes. Although the assist torque map shown in FIG. 3 represents the characteristic of the Basic Assist Torque Tas for the Steering Torque to the right direction, for the characteristic to the left direction, only the direction is opposite and the magnitude is the same as that for the characteristic to the right direction.

Subsequently, in Step S13, the Assist Control Unit 61 calculates a Target Instruction Torque T* by adding a compensating torque to the Basic Assist Torque Tas. The compensating torque is calculated as a sum of a return force to the basic position of the Steering Shaft 12, which increases proportionally to the Steering Angle θx, and a resisting force opposite to the rotation of the Steering Shaft 12, which increases proportionally to the Steering Velocity ωx. For this calculation, the rotation angle of the Electrical Motor 20 detected by the Rotation Angle Sensor 22 (corresponding to the Steering Angle θx of the Steering Handle 11). In addition, the Steering Velocity ωx is obtained by differentiating the Steering Angle θx of the Steering Handle 11 with respect to time.

Next, in Step S14, the Assist Control Unit 61 calculates a Target Current ias* proportional to the Target Instruction Torque T*. The Target Current is obtained by dividing the Target Instruction Torque T* by a torque constant.

Subsequently, in Step S15, the Assist Control Unit 61 reads in an Upper Limit Current imax from the Electrical Power Supply Control Unit 62. The Upper Limit Current imax is set in accordance with the heat generation condition of the Voltage Converter 40 and the heat generation condition of the Subsidiary Power Supply 50 during the electrical power supply control routine performed by the Electrical Power Supply Control Unit 62, and it represents the upper limit of the electrical current to be flown the Electrical Motor 20, in the present embodiment, the upper limit of the Drive Current im to be supplied to the Motor Drive Circuit 30. Next, in Step S16, whether the Target Current ias* calculated in the previous Step S14 exceeds the Upper Limit Current imax or not is judged, and when the Target Current ias* exceeds the Upper Limit Current imax (S16: Yes), in Step S17, the Upper Limit Current imax is set as a new Target Current ias*. On the other hand, when the Target Current ias* does not exceed the Upper Limit Current imax (S16: No), the Target Current ias* is not changed.

Thus the Target Current ias* is set, and then, in Step S18, the Assist Control Unit 61 reads in the Motor Current iuvw flowing through the Electrical Motor 20 from the Motor Current Sensor 38. Subsequently, in Step S19, the Motor Current iuvw is converted into the Drive Current im which is an input current of the Motor Drive Circuit 30, and a Deviation Δi between the Drive Current im and the previously calculated Target Current ias* is calculated, and a Target Instruction Voltage vm* is calculated through a feedback control based on the Deviation Δi. In the present embodiment, a PI control (proportional-integral control) based on the Deviation Δi is performed. The Motor Current Sensor 38 to detect the Motor Current iuvw and the functional part of the Assist Control Unit 61 to convert the Motor Current iuvw into the Drive Current im correspond to the actuator current detection means according to the present invention.

Then, in Step 20, the Assist Control Unit 61 outputs a PWM control signal corresponding to the Target Instruction Voltage vm* to the Motor Drive Circuit 30 and once exits from the control routine. The control routine is repeatedly executed in a predetermined short cycle. Accordingly, through the execution of the control routine, the duty ratio of the Switching Elements 31 to 36 in the Motor Drive Circuit 30 are adjusted to control the driving of the Electrical Motor 20, a desired assist torque according to the steering operation of a driver is obtained.

During the execution of such a steering assist control, especially on a stationary steering operation and on a handle steering at low speed running, large electrical power is needed. However, it is not preferable to increase the capacity of the Main Power Supply 100 for a temporary consumption of large electrical power. Therefore, the electrical power steering apparatus according to the present embodiment does not have the capacity of the Main Power Supply 100 enlarged, but instead comprises the Subsidiary Power Supply 50 to aid the electrical power supply by the Main Power Supply 100 on a temporary consumption of large electrical power. In addition, it comprises the Voltage Converter 40 in order to efficiently drive the Electrical Motor 20, and constitutes a system to supply a converted electrical power to the Electrical Motor 20.

When the steering assist control is performed to drive the Electrical Motor 20, the Voltage Converter 40 and the Subsidiary Power Supply 50 generate heat. Therefore, in the after-mentioned an electrical power supply control routine, the Electrical Power Supply Control Unit 62 detects the Voltage Converter Temperature Tb and the Subsidiary Power Supply Temperature Ts, and when at least one of the detected temperatures exceeds the overheat prevention starting temperature, it lowers the Upper Limit Current imax to limit the electrical power supplied to the Electrical Motor 20, and thereby prevents the overheat of the Voltage Converter 40 and the Subsidiary Power Supply 50. When the overheat prevention control is performed, if the heat generation condition of the Voltage Converter 40 and the heat generation condition of the Subsidiary Power Supply 50 are unbalanced, in some cases, even though one of them has enough temperature margin, the other generates heat and earlier reaches the overheat prevention starting temperature. In such cases, the electrical power supply capacity of an electrical power supply unit cannot be effectively used, and it comes to that the steering assist is limited in the early stage.

Then, in the present embodiment, the Electrical Power Supply Control Unit 62 controls the output current of the Voltage Converter 40 and the charge discharge current of the Subsidiary Power Supply 50, and a good balance between the heat generation condition of the Voltage Converter 40 and the heat generation condition of the Subsidiary Power Supply 50 is achieved, and the timing when the overheat prevention starts is delayed as much as possible.

Figure 4:
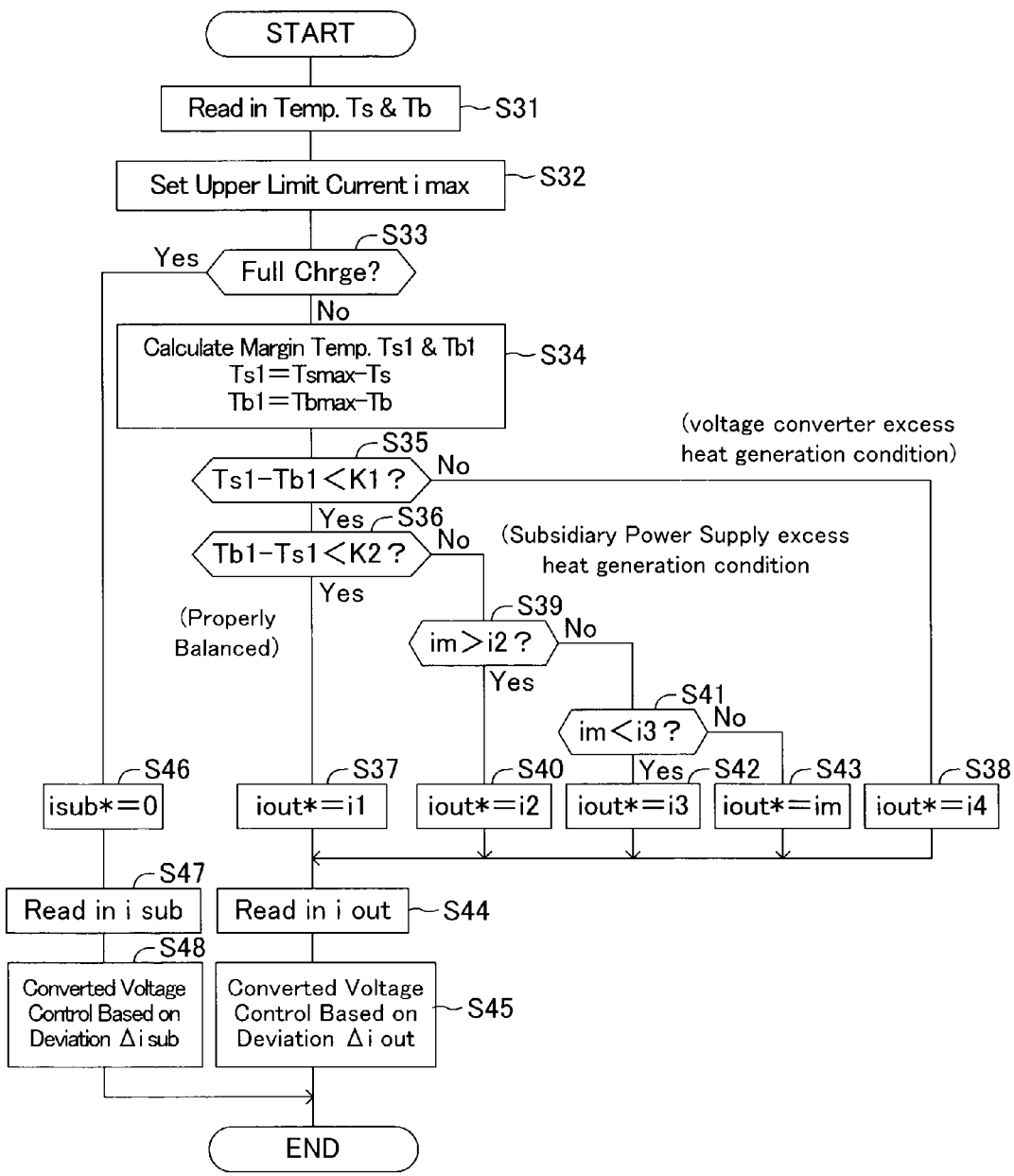
FIG. 4 is a flow chart showing an electrical power supply control routine.

Hereinafter, the electrical power supply control process performed by the Electrical Power Supply Control Unit 62 will be described. FIG. 4 shows an electrical power supply control routine performed by the Electrical Power Supply Control Unit 62. The electrical power supply control routine is stored as a control program in an ROM of the Electronic Control Unit 60, is started up by turning on an Ignition Switch 106, and is repeatedly executed in a predetermined short cycle.

Once the control routine starts up, the Electrical Power Supply Control Unit 62 first reads in the Voltage Converter Temperature Tb detected by the Voltage Converter Temperature Sensor 54, and the Subsidiary Power Supply Temperature Ts detected by the Subsidiary Power Supply Temperature Sensor 55 in Step S31. Subsequently, in Step S32, the Electrical Power Supply Control Unit 62 sets the Upper Limit Current imax based on the Voltage Converter Temperature Tb and the Subsidiary Power Supply Temperature Ts. The Upper Limit Current imax is the upper limit of the electrical current input to the Motor Drive Circuit 30 (drive current) set in order to prevent the overheat of the Voltage Converter 40 and the Subsidiary Power Supply 50. The Upper Limit Current imax is obtained based on an Upper Limit Current ibmax set correspondingly to the Voltage Converter Temperature Tb and an Upper Limit Current ismax set correspondingly to the Subsidiary Power Supply Temperature Ts.

The Upper Limit Current ibmax set by the Voltage Converter Temperature Tb is set at a predetermined maximum current imax0 when the Voltage Converter Temperature Tb is equal to the Overheat Prevention Starting Temperature Tb0 of the Voltage Converter 40 or less, and is set at a value which decreases in accordance with the temperature elevation thereof when the Voltage Converter Temperature Tb exceeds the Overheat Prevention Starting Temperature Tb0.

The Upper Limit Current ismax set by the Subsidiary Power Supply Temperature Ts is set at a predetermined maximum current imax0 when the Subsidiary Power Supply Temperature Ts is equal to the Overheat Prevention Starting Temperature Ts0 of the Subsidiary Power Supply 50 or less, and is set at a value which decreases in accordance with the temperature elevation thereof when the Subsidiary Power Supply Temperature Ts exceeds the Overheat Prevention Starting Temperature Ts0.

Figure 5:
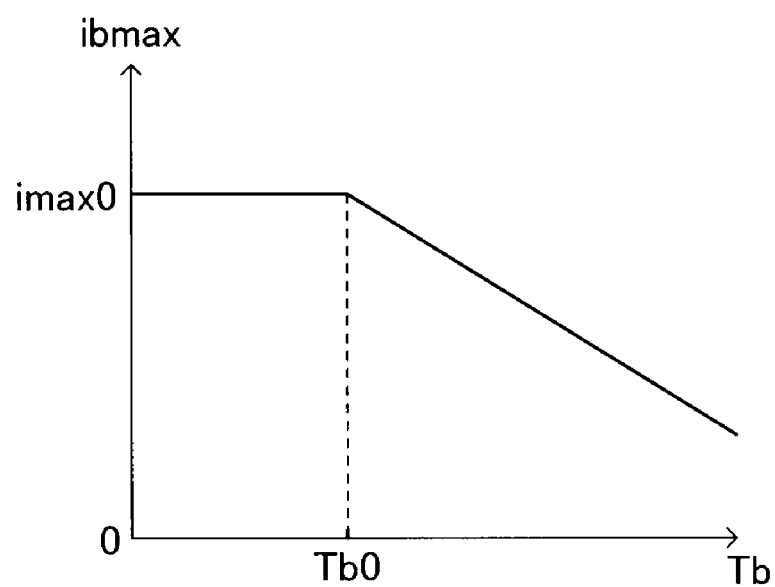
FIG. 5 is a characteristic diagram showing an upper limit current set by a voltage converter temperature.
Figure 6:
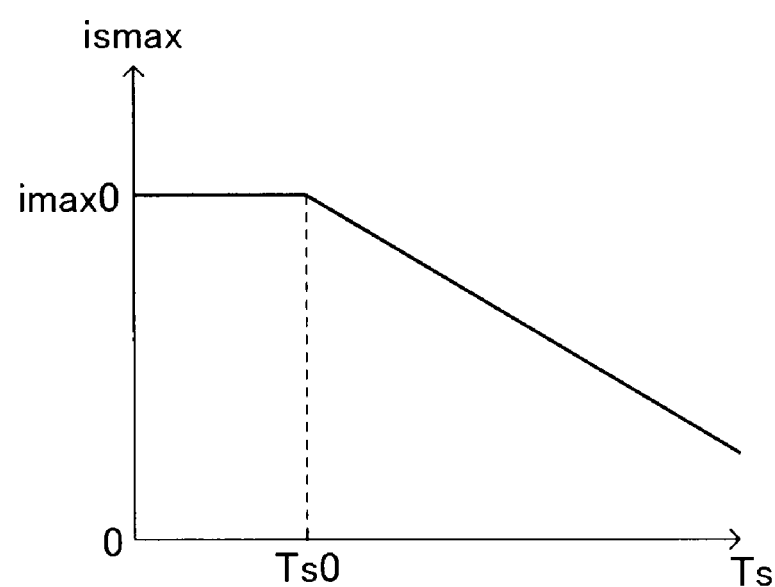
FIG. 6 is a characteristic diagram showing an upper limit current set by a subsidiary power supply temperature.

The Upper Limit Current imax is set at the smaller value of the Upper Limit Current ibmax set by the Voltage Converter Temperature Tb and the Upper Limit Current ismax set by the Subsidiary Power Supply Temperature Is after comparing them. The process for setting the Upper Limit Current imax may be performed by storing the characteristics shown in FIGS. 5 and 6 as maps or calculating formulae in a ROM of the Electronic Control Unit 60 and then reading out the characteristics. The process wherein the Electrical Power Supply Control Unit 62 sets the Upper Limit Current imax (S32) and the process wherein, based on the Upper Limit Current imax, the Assist Control Unit 61 limits the drive current of the Motor Drive Circuit 30 at the Upper Limit Current imax or less (S15 to S17) correspond to the overheat prevention means according to the present invention.

Subsequently, in Step S33, the Electrical Power Supply Control Unit 62 judges whether the Subsidiary Power Supply 50 is in a full charge condition or not. The charging status (storing status) of the Subsidiary Power Supply 50 is judged by a charging condition detection routine other than this electrical power supply control routine and, in this Step S33, the result of the judgment by a charging condition detection routine is read in. The charging status of the Subsidiary Power Supply 50 can be detected by measuring the terminal voltage of the Subsidiary Power Supply 50. The terminal voltage of the Subsidiary Power Supply 50 is equal to the Converted Voltage vout detected by the Converted Voltage Sensor 52 when the Charge Discharge Current isub detected by the Charge Discharge Current Sensor 53 is zero, i.e. neither the charging current nor the discharging current flows. Accordingly, in the present embodiment, the charging status of the Subsidiary Power Supply 50 is judged based on the Charge Discharge Current isub and the Converted Voltage vout.

Figure 7:
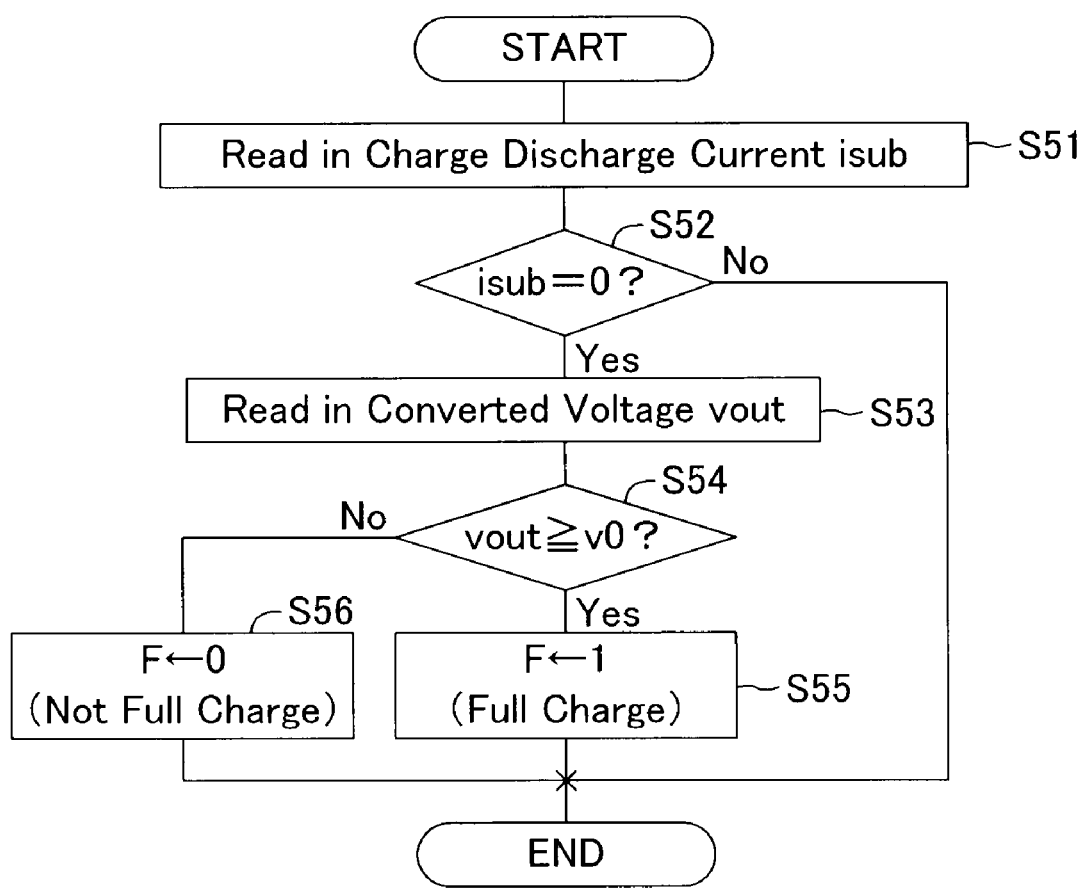
FIG. 7 is a flow chart showing a charging condition detection routine.

FIG. 7 shows a charging condition detection routine performed by the Electrical Power Supply Control Unit 62. The charging condition detection routine is stored as a control program in an ROM or the like of the Electrical Power Supply Control Unit 62, and is repeatedly executed in a predetermined short cycle. Once the charging condition detection routine starts up, the Electrical Power Supply Control Unit 62 first reads in the Charge Discharge Current isub detected by the Charge Discharge Current Sensor 53. Subsequently, in Step S52, whether the Charge Discharge Current isub is zero or not, i.e. whether neither the charging current nor the discharging current flows or not, is judged. When the Charge Discharge Current isub is not zero, the Electrical Power Supply Control Unit 62 once ends the routine.

The Electrical Power Supply Control Unit 62 repeats such a process, when the Charge Discharge Current isub is detected to be zero (S52: Yes), in Step S53, the Converted Voltage vout detected by the Converted Voltage Sensor 52 is read in. Subsequently, in Step S54, whether the Converted Voltage vout is less than a Reference Voltage v0 for judging full charge or not is judged. When the Converted Voltage vout is the Reference Voltage v0 or more, in Step S55, it is judged that the Subsidiary Power Supply 50 is in a full charge condition and a Flag F is set at "1", and when the Converted Voltage vout is less than the Reference Voltage v0, in Step S56, it is judged that the Subsidiary Power Supply 50 is not in a full charge condition and the Flag F is set at "0". After the Electrical Power Supply Control Unit 62 judges the charging status of the Subsidiary Power Supply 50 and sets the Flag F, it once ends this routine. By repeating such a process, the latest charging status (storing status) of the Subsidiary Power Supply 50 can be judged from the setting status of the Flag F.

Now, returning to the description of the electrical power supply control routine shown in FIG. 4. In Step S33, the Electrical Power Supply Control Unit 62 reads in the Flag F to judge the charging status of the Subsidiary Power Supply 50, and performs the processes in Steps S46 to S48 when the Subsidiary Power Supply 50 is in a full charge condition (F=1). On the other hand, when the Subsidiary Power Supply 50 is not in a full charge condition (F=0), the processes in Steps S34 to S45 are performed. These processes performed when the Subsidiary Power Supply 50 is not in a full charge condition correspond to the processes performed by the heat generation balance detection means and current control means according to the present invention.

When the Subsidiary Power Supply 50 is not in a full charge condition, in Step S34, the Electrical Power Supply Control Unit 62 calculates a Margin Temperature Ts1 of the Subsidiary Power Supply 50 and a Margin Temperature Tb1 of the Voltage Converter 40 by using the following formulae (1) and (2).

$$Ts1 = Ts\max - Ts \qquad (1)$$

$$Tb1 = Tb\max - Tb \qquad (2)$$

Herein, the Tsmax is the highest temperature at which the Subsidiary Power Supply 50 is operable. Also, the Tbmax is the highest temperature at which the Voltage Converter 40 is operable. The Tsmax and Tbmax correspond to the set allowable temperature according to the present invention. In this case, it is preferable to set the Tsmax and Tbmax at the same values as the above-mentioned Overheat Prevention Starting Temperatures Ts0 and Tb0, respectively.

Since the Margin Temperatures Ts1 and Tb1 are temperatures obtained by subtracting the detected temperatures Ts and Tb from the highest temperatures Tsmax and Tbmax, respectively, the closer to the highest temperatures Tsmax and Tbmax the detected temperatures Ts and Tb are, the smaller they become and, conversely, the further from the highest temperatures Tsmax and Tbmax the detected temperatures Ts and Tb are, the larger they become. Accordingly, the Margin Temperatures Ts1 and Tb1 represent the temperature margins.

Subsequently, in Step S35, the Electrical Power Supply Control Unit 62 judges whether the value obtained by subtracting the Margin Temperature Tb1 from the Margin Temperature Ts1 (Ts1−Tb1) is less than the Reference Value K1 or not. The Reference Value K1 is a preset constant of zero or more. When the judgment in Step 35 is "Yes", the Electrical Power Supply Control Unit 62 further judges whether the value obtained by subtracting the Margin Temperature Ts1 from the Margin Temperature Tb1 (Tb1−Ts1) is less than a Reference Value K2 or not in Step S36. The Reference Value K2 is also a preset constant of zero or more. When the judgment in Step 36 is "Yes", the difference between the Margin Temperature Ts1 and the Margin Temperature Tb1 is small, and the heat generation condition of the Voltage Converter 40 and the heat generation condition of the Subsidiary Power Supply 50 are well-balanced. Hereinafter, a condition wherein the heat generation condition of the Voltage Converter 40 and the heat generation condition of the Subsidiary Power Supply 50 are thus well-balanced will be referred to as properly balanced condition.

When the properly balanced condition is detected based on the judgments in Steps S35 and S36, the Electrical Power Supply Control Unit 62 sets a Target Converted Current Iout* at a preset First Current i1 in Step S37.

On the other hand, when, in Step 35, it is judged as "No", i.e. Ts1−Tb1≧K1, the Margin Temperature Tb1 of the Voltage Converter 40 is smaller than the Margin Temperature Ts1 of the Subsidiary Power Supply 50, and the difference between these Margin Temperatures is the Reference Value K1 or more. Accordingly, in this case, the heat generation condition of the Voltage Converter 40 and the heat generation condition of the Subsidiary Power Supply 50 are unbalanced, and the Voltage Converter 40 is closer to an overheat condition as compared with the Subsidiary Power Supply 50. Hereinafter, a heat generation condition in such a balance will be referred to as a voltage converter excess heat generation condition.

When the voltage converter excess heat generation condition is detected based on the judgment in Step S38, the Electrical Power Supply Control Unit 62 sets the Target Converted Current Iout* of the Voltage Converter 40 at a preset Fourth Current i4 in Step S38. The Fourth Current i4 has been set at an electrical current value lower than the First Current i1.

When it is judged as "Yes" in Step S35 and further it judged as "No" in Step S36, i.e. Tb1−Ts1≧K2, the Margin Temperature Ts1 of the Subsidiary Power Supply 50 is smaller than the Margin Temperature Tb1 of the Voltage Converter 40, and the difference between these Margin Temperatures is the Reference Value K2 or more. Accordingly, in this case, the heat generation condition of the Voltage Converter 40 and the heat generation condition of the Subsidiary Power Supply 50 are unbalanced, and the Subsidiary Power Supply 50 is closer to an overheat condition as compared with the Voltage Converter 40. Hereinafter, a heat generation condition in such a balance will be referred to as a subsidiary power supply excess heat generation condition.

When it is judged as to be in the subsidiary power supply excess heat generation condition (S36: No), the Electrical Power Supply Control Unit 62 sets the Target Converted Current Iout* of the Voltage Converter 40 as follows based on the magnitude of the Drive Current im input to the Motor Drive Circuit 30. First, in Step S39, whether the Drive Current im is larger than the Second Current i2 or not is judged. The Drive Current im is calculated from the Motor Current iuvw, when the Assist Control Unit 61 performs the above-mentioned steering assist control. Accordingly, the Electrical Power Supply Control Unit 62 reads in the Drive Current im from the Assist Control Unit 61, and compares the Drive Current im with the Second Current i2. The Second Current i2 has been set at a current value larger than the First Current i1. The Drive Current im may be detected by a current sensor disposed at the power input portion of the Motor Drive Circuit 30.

When the Drive Current im is judged to be larger than the Second Current i2 (S39: Yes), the Electrical Power Supply Control Unit 62 sets the Target Converted Current Iout* at the Second Current i2 in Step S40. The Second Current i2 has been set at a current value larger than the First Current i1. On the other hand, when the Drive Current im is judged to be the Second Current i2 or less (S39: No), whether the Drive Current im is smaller than the Third Current i3 or not is judged in Step S41. When the Drive Current im is judged to be smaller than the Third Current i3 (S41: Yes), the Target Converted Current Iout* is set at the Third Current i3 in Step S42. The Third Current i3 has been set at an electrical current value smaller than the First Current i1.

When it is judged as "No" in Step S41, i.e. when the Drive Current im is judged to be the Second Current i2 or less and to be the Third Current i3 or more (i3≦im≦i2), the Electrical Power Supply Control Unit 62 sets the Target Converted Current Iout* at the same value as the Drive Current im.

After setting the Target Converted Current Iout* an accordance with the balance between the heat generation conditions, the Electrical Power Supply Control Unit 62 reads in the current Converted Current iout detected by the Converted Current Sensor 51. Next, in Step S45, the Electrical Power Supply Control Unit 62 controls the converted voltage of the Voltage Converter 40 based on the Deviation Δiout between the Target Converted Current Iout* and the actual Converted Current iout (iout*−iout) so that the Deviation Δi becomes zero. In this case, the Electrical Power Supply Control Unit 62 changes the converted voltage of the Voltage Converter 40 by adjusting the duty ratio of the PWM signal output to the First Voltage Converting Switching Element 43 and the Second Voltage Converting Switching Element 44, to performs a feedback control so that the Converted Current im becomes equal to the Target Converted Current iout*.

In addition, when it is judged in Step S33 that the Subsidiary Power Supply 50 is in a full charge condition, the Electrical Power Supply Control Unit 62 sets the Target Charge Discharge Current isub* at zero (isub=0) in Step S46. Next, in Step S47, the Charge Discharge Current isub detected by the Charge Discharge Current Sensor 53 is read in. Subsequently, in Step S48, the Electrical Power Supply Control Unit 62 controls the converted voltage of the Voltage Converter 40 based on the Deviation Δisub between the Target Charge Discharge Current isub* and the actual Charge Discharge Current isub (isub*−isub) so that the Deviation Δi becomes zero. In this case, the Electrical Power Supply Control Unit 62 changes the converted voltage of the Voltage Converter 40 by adjusting the duty ratio of the PWM signal output to the First Voltage Converting Switching Element 43 and the Second Voltage Converting Switching Element 44, to performs a feedback control so that the Charge Discharge Current isub becomes zero (neither the charging current nor the discharging current flows through the Subsidiary Power Supply 50).

Even in the case where the voltage conversion is controlled with the Charge Discharge Current isub set at zero, when the Motor Drive Circuit 30 consumes large electrical power, the output voltage of the Voltage Converter 40 decreases due to the shortage of the output power of the Voltage Converter 40. Therefore, the Subsidiary Power Supply 50 supplies electrical power to the Motor Drive Circuit 30 to compensate the shortfall of the performance of the Voltage Converter 40.

After the Electrical Power Supply Control Unit 62 controls the converted voltage in Step S45 or Step S48, the Electrical Power Supply Control Unit 62 once ends the electrical power supply control routine. The control routine is repeatedly executed in a predetermined short cycle. The processes in Step S34 to S36 executed by the Electrical Power Supply Control Unit 62 correspond to the heat generation balance detection means according to the present invention, and the processes in Step S37 to S45 correspond to the current control means according to the present invention.

Figure 8:
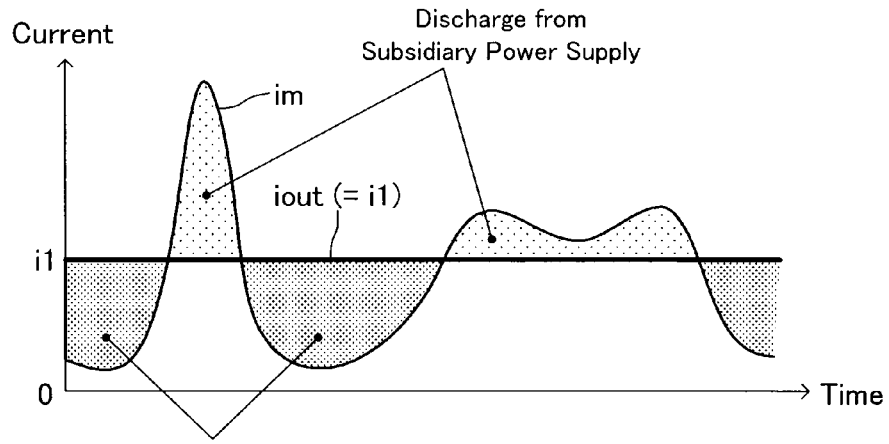
FIG. 8 is a graph showing a transition of a converted current, a charge discharge current, and a drive current in an appropriately balanced condition.
Figure 9:
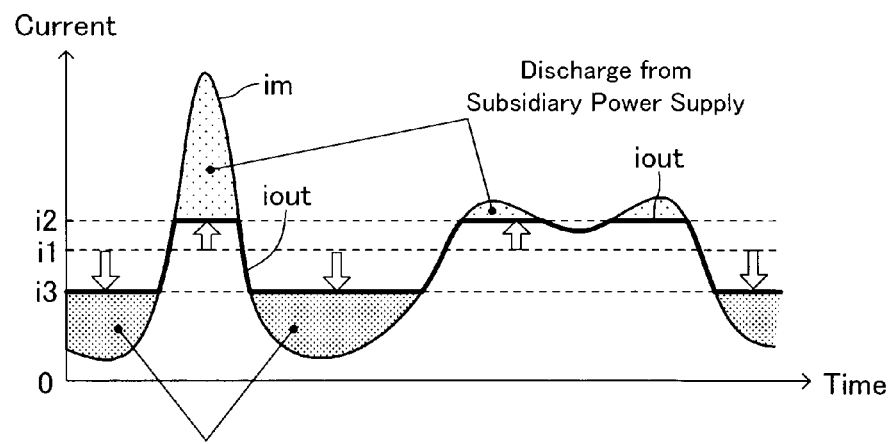
FIG. 9 is a graph showing a transition of a converted current, a charge discharge current, and a drive current in a subsidiary power supply overheated condition.
Figure 10:
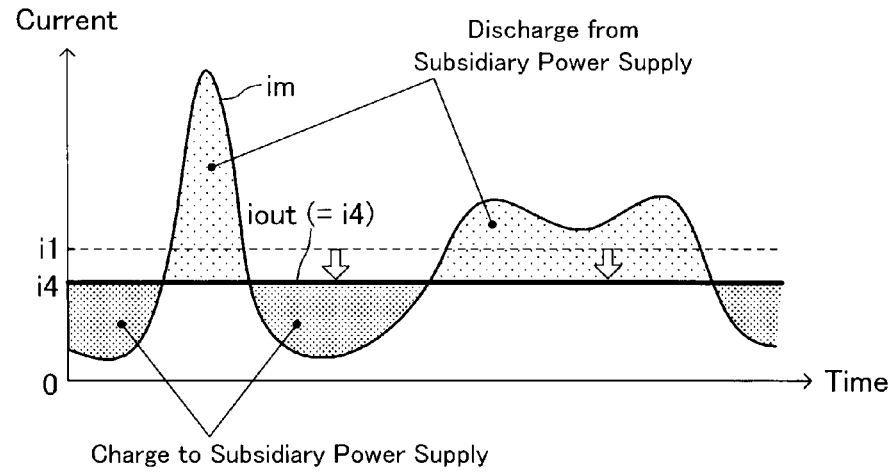
FIG. 10 is a graph showing a transition of a converted current, a charge discharge current, and a drive current in a voltage converter overheated condition.

Now, referring to FIG. 8 to FIG. 10, the Converted Current iout of the Voltage Converter 40 and the Charge Discharge Current isub of the Subsidiary Power Supply 50, controlled by the execution of the electrical power supply control routine, will be described. FIG. 8 to FIG. 10 are graphs representing the transition of the Converted Current iout, the Charge Discharge Current isub, and the Drive Current im, respectively, when steering operations are repeated with the Subsidiary Power Supply 50 not in a full charge condition, and FIG. 8 is a graph in a properly balanced condition, FIG. 9 is a graph in a subsidiary power supply excess heat generation condition, and FIG. 10 is a graph in a voltage converter excess heat generation condition.

As shown in FIG. 8, in the properly balanced condition, the Target Converted Current iout* is set at the First Current i1. Accordingly, when the Drive Current im flowing through the Motor Drive Circuit 30 under the steering assist control is smaller than the First Current i1, not only the Drive Current im flows from the Voltage Converter 40 to the Motor Drive Circuit 30, but also the surplus (i1−im) flows to the Subsidiary Power Supply 50 and the Subsidiary Power Supply 50 is charged. When a large steering assist affects and the Drive Current im becomes larger than the First Current i1, the shortfall which is a gap from the converted current i1 (im−i1) automatically flows from the Subsidiary Power Supply 50 to the Motor Drive Circuit 30 as a discharging current.

In the subsidiary power supply excess heat generation condition, as shown in FIG. 9, the Target Converted Current iout* is set in accordance with the magnitude of the Drive Current im. When the Drive Current im is smaller than the Third Current i3 (im<i3), the Target Converted Current Iout* is set at the Third Current i3. Accordingly, not only the Drive Current im flows from the Voltage Converter 40 to the Motor Drive Circuit 30, but also the surplus (i3−im) flows to the Subsidiary Power Supply 50. Since the Third Current i3 has been set at a value smaller than the First Current i1, the charging current flowing through the Subsidiary Power Supply 50 comes to be smaller than the charging current in the properly balanced condition. Accordingly, the charging of the Subsidiary Power Supply 50 is suppressed.

In addition, when the Drive Current im is the Third Current i3 or more and is the Second Current i2 or less (i3≦im≦i2), the Target Converted Current iout* is set at the same current value as the Drive Current im. Accordingly, only the Drive Current im flows from the Voltage Converter 40 to the Motor Drive Circuit 30, and neither a charging current nor a discharging current flows through the Subsidiary Power Supply 50. When the Drive Current im is larger than the Second Current i2 (im>i2), the shortfall which is a gap from the converted current i2 (im−i2) automatically flows from the Subsidiary Power Supply 50 to the Motor Drive Circuit 30 as a discharging current. Since the Second Current i2 has been set at a value larger than the First Current i1, the discharging current flowing from the Subsidiary Power Supply 50 comes to be smaller than the discharging current in the properly balanced condition. Accordingly, the discharging of the Subsidiary Power Supply 50 is suppressed.

Thus, in the subsidiary power supply excess heat generation condition, since the charging of the Subsidiary Power Supply 50 by the Voltage Converter 40 and the discharging from the Subsidiary Power Supply 50 to the Motor Drive Circuit 30 are suppressed, the heat generation of the Subsidiary Power Supply 50 is suppressed. Accordingly, the temperature margin degree of the Voltage Converter 40 (Margin Temperature Tb1) and the temperature margin degree of the Subsidiary Power Supply 50 (Margin Temperature Ts1) gradually come close to each other, the unbalance between the heat generation condition of the Voltage Converter 40 and the heat generation condition of the Subsidiary Power Supply 50 is improved.

In the voltage converter excess heat generation condition, as shown in FIG. 10, the Target Converted Current iout* is set at the Fourth Current i4. When the Drive Current im is larger than the Fourth Current i4, the shortfall which is a gap from the converted current i4 (im−i4) automatically flows from the Subsidiary Power Supply 50 to the Motor Drive Circuit 30 as a discharging current. Since the Fourth Current i4 has been set at a value smaller than the First Current i1, as compared with the properly balanced condition, the electrical power supply aid of the Subsidiary Power Supply 50 to the Motor Drive Circuit 30 is accelerated, and the electrical power supply load of the Voltage Converter 40 decreases. When the Drive Current im is smaller than the Fourth Current i4, although a charging current flows from the Voltage Converter 40 to the Subsidiary Power Supply 50, the charging current comes to be the surplus of the Converted Current i4 of the Voltage Converter 40 (i4−im), and therefore it is suppressed low.

Thus, in the voltage converter excess heat generation condition, the charging of the Subsidiary Power Supply 50 by the Voltage Converter 40 is suppressed and the discharging from the Subsidiary Power Supply 50 to the Motor Drive Circuit 30 is accelerated, and thereby the heat generation of the Voltage Converter 40 is suppressed. Accordingly, the temperature margin degree of the Voltage Converter 40 (Margin Temperature Tb1) and the temperature margin degree of the Subsidiary Power Supply 50 (Margin Temperature Ts1) gradually come close to each other, the unbalance between the heat generation condition of the Voltage Converter 40 and the heat generation condition of the Subsidiary Power Supply 50 is improved.

When strong steering operations are intermittently repeated, the charging and discharging of the Subsidiary Power Supply 50 are alternately repeated, the Voltage Converter 40 and the Subsidiary Power Supply 50 respectively generate large amount of heat. The Assist Control Unit 61 lowers the Upper Limit Current imax of the Electrical Motor 20 when the Voltage Converter Temperature Tb or the Subsidiary Power Supply Temperature Ts exceeds the overheat prevention starting temperature Tb0 (=Tbmax) or Ts0 (=Tsmax) respectively. Accordingly, the steering assist is suppressed. In case of such an overheat prevention, when the heat generation condition of the Voltage Converter 40 and the heat generation condition of the Subsidiary Power Supply 50 are unbalanced, even though one of them has enough temperature margin, the other generates heat and earlier reaches the overheat prevention starting temperature, and the output limiting of the Electrical Motor 20 starts early.

Then, in the present embodiment, the Electrical Power Supply Control Unit 62 controls the converted voltage of the Voltage Converter 40 so that the temperature margin degree of the Voltage Converter 40 and the temperature margin degree of the Subsidiary Power Supply 50 get closer to each other, and thereby matches the timing when the Voltage Converter Temperature Tb reaches the overheat prevention starting temperature and the timing when the Subsidiary Power Supply Temperature Ts reaches the overheat prevention starting temperature. Accordingly, the period in which inherent steering assist performance is maintained can be extended.

Figure 11:
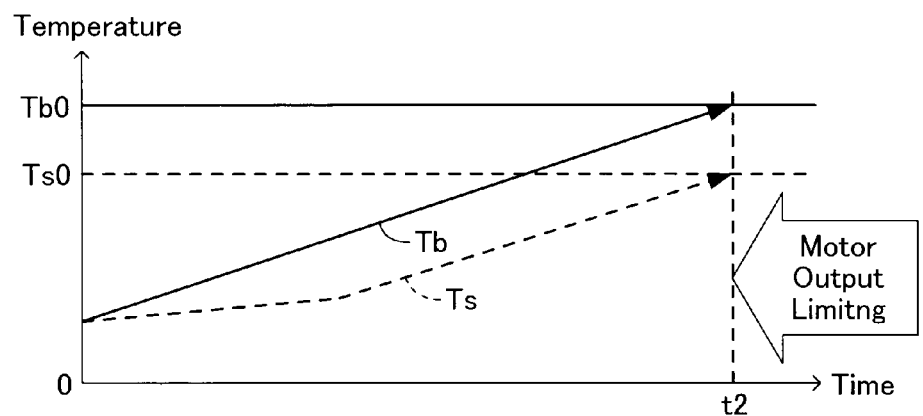
FIG. 11 is a graph showing a transition of a voltage converter temperature and a subsidiary power supply temperature under an electrical power supply control according to the present embodiment.
Figure 12:
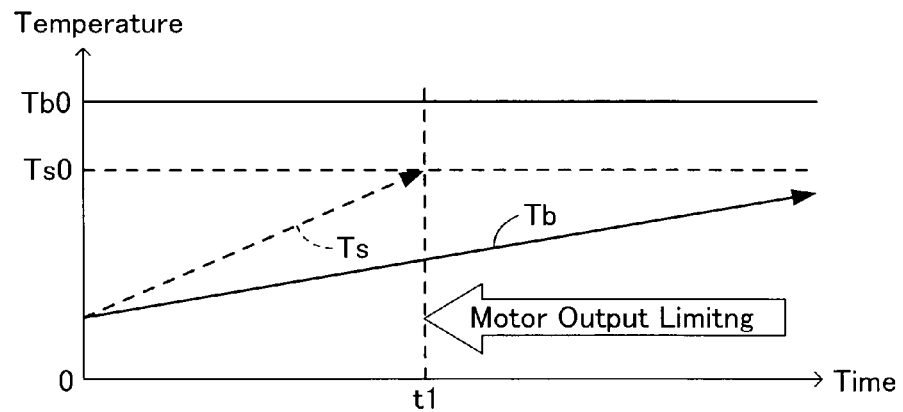
FIG. 12 is a graph showing a transition of a voltage converter temperature and a subsidiary power supply temperature not under an electrical power supply control according to the present embodiment.

FIG. 11 and FIG. 12 are graphs showing transitions of the Voltage Converter Temperature Tb and the Subsidiary Power Supply Temperature Ts, and FIG. 11 represents a temperature transition in the case wherein, as in the present embodiment, the converted voltage of the Voltage Converter 40 is controlled based on the temperature margin degree of the Voltage Converter 40 and the temperature margin degree of the Subsidiary Power Supply 50, and FIG. 12 represents a temperature transition in the case wherein the voltage conversion is not controlled as described above and the converted voltage is constant. As apparent from the figures, when the voltage conversion is not controlled based on the temperature margin degrees (FIG. 12), while the Voltage Converter 40 has enough temperature margin, the Subsidiary Power Supply Temperature Ts reaches the overheat prevention starting temperature Ts0, and the output limiting of the Electrical Motor 20 (decrease in the Upper Limit Current imax) starts at the time of t1.

On the other hand, when, as in the present embodiment, the voltage conversion is controlled based on the temperature margin degrees (FIG. 11), the timing when the Voltage Converter Temperature Tb reaches the Overheat Prevention Starting Temperature Tb0 and the timing when the Subsidiary Power Supply Temperature Ts reaches the Overheat Prevention Starting Temperature Ts0 nearly match, and the time when the output limiting of the Electrical Motor 20 starts can be delayed from t1 to t2. Accordingly, the electrical power supply capacity of the Voltage Converter 40 and the Subsidiary Power Supply 50 can be efficiently used to drive the Electrical Motor 20. Therefore, even when strong steering operations are repeated, the period in which good steering assist performance is maintained is extended, and it becomes very easy for a driver to use.

Also, in the present embodiment, since the Converted Current iout and the Charge Discharge Current isub can be controlled at the same time by controlling the converted voltage of the Voltage Converter 40, the balance between the heat generation conditions can be easily adjusted. Since the Margin Temperatures Tb1 and Ts1 are used for detecting the balance between the heat generation conditions, it is easy to detect the balance.

Also, in the present embodiment, since a good balance between the heat generation conditions can be maintained, a large radiator is not needed, and a sufficient retention period can be achieved with a relatively small radiator, and thereby its weight and cost can be saved.

Next, a modification for the detection of the balance between the heat generation condition of the Voltage Converter 40 and the heat generation condition of the Subsidiary Power supply 50 will be described. Although, in the above-mentioned embodiment, the Margin Temperatures Tb1 and Ts1 are used for detecting the balance between the heat generation conditions, a temperature margin degree may be calculated from the relation between the temperature width from an ordinary temperature to an allowable temperature and an actually detected temperature to detect the balance between the heat generation conditions from the magnitude relation of the temperature margin degrees. For example, with Tsmax, the highest temperature at which the Subsidiary Power Supply 50 is operable (set allowable temperature), and T2s, the set ordinary temperature of the Subsidiary Power Supply 50 (temperature in a condition where the Subsidiary Power Supply 50 has not yet generated any heat), and Tbmax, the highest temperature at which the Voltage Converter 40 is operable, and T2b, the set ordinary temperature of the Voltage Converter 40, As, which is the temperature margin degree of the Subsidiary Power Supply 50, and Ab, which is the temperature margin degree of the Voltage Converter 40, are calculated from the following formulae (3) and (4).

$$As=(Tsmax-Ts)/(Tsmax-T2s) \quad (3)$$

$$Ab=(Tbmax-Tb)/(Tbmax-T2b) \quad (4)$$

Figure 13:
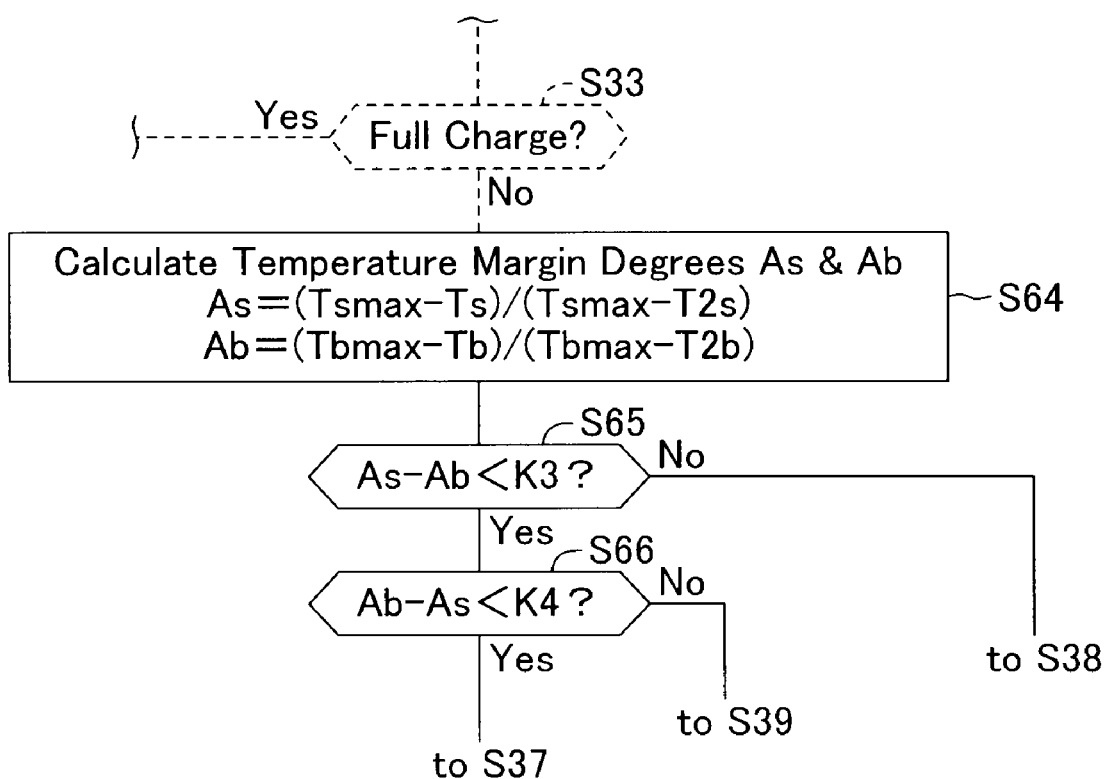
FIG. 13 is a flow chart showing a part of an electrical power supply control routine according as a modified example.

In the formulae (3) and (4), the denominator represents a temperature width from a set ordinary temperature to a set allowable temperature, and the denominator represents a margin temperature from a detected temperature to a set allowable temperature. Accordingly, the temperature margin degrees As and Ab are respectively calculated as a ratio of a margin temperature from a detected temperature to a set allowable temperature to a temperature width from a set ordinary temperature to a set allowable temperature. In this case, the electrical power supply control routine in FIG. 4 performs the Steps S64, S65, and S66 shown in FIG. 13 in place of the processes in Steps S34, S35, and S36.

In Step S65, the Electrical Power Supply Control Unit 62 judges whether the value (As−Ab) obtained by subtracting the temperature margin degree Ab of the Voltage Converter 40 from the temperature margin degree As of the Subsidiary Power Supply 50 is less than a Reference Value K3 or not. The Reference Value K3 is a preset constant of zero or more. When it is judged as "No", i.e. As−Ab≧K3, in this Step S65, the temperature margin degree Ab of the Voltage Converter 40 is smaller than the temperature margin degree As of the Subsidiary Power Supply 50, and the difference of the temperature margins is the Reference Value K3 or more. Accordingly, in this case, the heat generation condition of the Voltage Converter 40 and the heat generation condition of the Subsidiary Power Supply 50 are unbalanced, and the Voltage Converter 40 is closer to an overheat condition as compared with the Subsidiary Power Supply 50. Namely, it can be judged to be in the voltage converter excess heat generation condition. Therefore, the Electrical Power Supply Control Unit 62 performs the process in the aforementioned Step S38.

In addition, when it is judged as "Yes" in Step S65, the Electrical Power Supply Control Unit 62 judges, in Step S66, whether the value (Ab−As) obtained by subtracting the temperature margin degree As of the Subsidiary Power Supply 50 from the temperature margin degree Ab of the Voltage Converter 40 is less than a Reference Value K4 or not. The Reference Value K4 is a preset constant of zero or more. When it is judged as "No", i.e. Ab−As≧K4, in this Step S66, the temperature margin degree As of the Subsidiary Power Supply 50 is smaller than the temperature margin degree Ab of the Voltage Converter 40, and the difference of the temperature margins is the Reference Value K4 or more. Accordingly, in this case, the heat generation condition of the Voltage Converter 40 and the heat generation condition of the Subsidiary Power Supply 50 are unbalanced, and the Subsidiary Power Supply 50 is closer to an overheat condition as compared with the Voltage Converter 40. Namely, it can be judged to be in the subsidiary power supply excess heat generation condition. Therefore, the Electrical Power Supply Control Unit 62 performs the process in the aforementioned Step S39.

In addition, when it is judged as "Yes" in Step S65 and Step S66, the Electrical Power Supply Control Unit 62 performs the process in the aforementioned Step S37 since it is in the properly balanced condition.

Further, the temperature margin index value Xs of the Subsidiary Power Supply 50 and the temperature margin index value Xb of the Voltage Converter 40 may be calculated by the following formulae (5) and (6) in place of the aforementioned formulae (3) and (4), and the balance between the heat generation condition of the Subsidiary Power Supply 50 and the heat generation condition of the Voltage Converter 40 may be detected from the temperature margin index values Xs and Xb.

$$Xs=(Ts\max-T2s)/(Ts\max-T2s) \quad (5)$$

$$Xb=(Tb\max-T2b)/(Tb\max-T2b) \quad (6)$$

In this case, the smaller the temperature margin degrees are, the larger the temperature margin index values Xs and Xb are. Accordingly, in the process in the aforementioned Step S65, it is enough to judge whether the value (Xb−Xs) obtained by subtracting the temperature margin index value Xs from the temperature margin index value Xb is less than the Reference Value K3 or not. Also, in the process in the aforementioned Step S66, it is enough to judge whether the value (Xs−Xb) obtained by subtracting the temperature margin index value Xb from the temperature margin index value Xs is less than the Reference Value K4 or not.

In the modification described above, when an electrical power supply system is configured so that the difference between the temperature width in the Voltage Converter 40 and that in the Subsidiary Power Supply 50 is large, the levels of the heat generation conditions can be furthermore appropriately judged. Accordingly, the balance between the heat generation condition of the Subsidiary Power Supply 50 and the heat generation condition of the Voltage Converter 40 can be maintained furthermore accurately.

Although the electrical power steering apparatuses comprising the electrical power supply unit as embodiments according to the present invention have been described above, the present invention is not limited to the embodiments and various modifications are possible, so long as they do not go beyond the purpose of the invention.

For example, although the present embodiment applies to the electrical power supply unit for an electrical power steering apparatus, the application of the electrical power supply unit is not limited to an electrical power steering apparatus, and it can be applied to various apparatuses. For example, it can be applied to various in-vehicle apparatuses such as air control breaking devices, electric control suspension devices, electric control stabilizer devices, and the like. In addition, it can be applied to, as steering apparatuses to impart steering force to vehicle, steer-by-wire type steering apparatuses wherein a steering wheel and a wheel steering shaft are mechanically decoupled and the wheels are turned only by an electrical motor which operates in accordance with steering operations, too.

In addition, although, in the present embodiment, the Electrical Power Supply Control Unit 62 constituting a part of the electrical power supply unit and the Assist Control Unit 61 constituting a part of the electrical power steering apparatus are disposed within the Electronic Control Unit 60, each of the Control Units 61 and 62 may be configured with a separate microcomputer.

Also, Although the Reference Values (K1, K2) and (K3, K4) used in the electrical power supply control routine are constant of zero or more, it is preferable to set them at values to a certain extent larger than zero since the judgments frequently change over if both of them are zero. In addition, the Reference Values (K1, K2) or (K3, K4) may be variable in accordance with the subsidiary power supply temperature Ts or the voltage converter temperature Tb.

The invention claimed is:

1. An electrical power supply unit for vehicle comprising:
   a main power supply,
   a voltage converter for converting the output voltage of the main power supply to supply electrical power to an electrical actuator for the vehicle,
   a subsidiary power supply, which is connected in parallel with said electrical actuator for vehicle to said voltage converter to be charged by said voltage converter and to aid the electrical power supply for said electrical actuator for the vehicle by using its stored electrical power,
   a voltage converter temperature detection means for detecting the temperature of said voltage converter,
   a subsidiary power supply temperature detection means for detecting the temperature of said subsidiary power supply,
   an overheat prevention means for preventing the overheat of said voltage converter and said subsidiary power supply based on said detected temperature of said voltage converter and said detected temperature of said subsidiary power supply,
   a heat generation balance detection means for detecting the balance between a heat generation condition of said voltage converter and a heat generation condition of said subsidiary power supply based on said detected temperature of said voltage converter and said detected temperature of said subsidiary power supply, and
   a current control means for controlling the output current of said voltage converter and a charge discharge current flowing through said subsidiary power supply based on said detected balance between the heat generation conditions.

2. An electrical power supply unit for vehicle according to claim 1, characterized in that said current control means controls an output current of said voltage converter and the charge discharge current flowing through said subsidiary power supply by adjusting the converted voltage of said voltage converter.

3. An electrical power supply unit for a vehicle according to claim 1 or claim 2, characterized in that said heat generation balance detection means detects the balance between the heat generation condition of said voltage converter and the heat generation condition of said subsidiary power supply based on a magnitude correlation between a temperature margin degree of said voltage converter and a temperature margin degree of said subsidiary power supply.

4. An electrical power supply unit for vehicle according to claim 3, characterized in that said heat generation balance detection means uses the temperature obtained by subtracting the temperature detected by said voltage converter temperature detection means from a set allowable temperature of said voltage converter, as the temperature margin degree of said voltage converter and uses the temperature obtained by subtracting the temperature detected by said subsidiary power supply temperature detection means from a set allowable temperature of said subsidiary power supply, as the temperature margin degree of said subsidiary power supply.

5. An electrical power supply unit for a vehicle according to claim 3, characterized in that said heat generation balance detection means judges the magnitude correlation between the temperature margin degree of said voltage converter and the temperature margin degree of said subsidiary power supply, based on the relation between a temperature width from a set ordinary temperature of said voltage converter to a set allowable temperature of said voltage converter and the temperature detected by said voltage converter temperature detection means and the relation between a temperature width from the set ordinary temperature of said subsidiary power supply to a set allowable temperature of said subsidiary power supply and the temperature detected by said subsidiary power supply temperature detection means.

6. An electrical power supply unit for a vehicle according to claim 3, characterized in that, in case where said detected balance between the heat generation conditions is out of a preset allowable balance range, said current control means suppresses both of charging and discharging of said subsidiary power supply when said temperature margin degree of said subsidiary power supply is smaller than said temperature margin degree of said voltage converter, while said current control means suppresses charging of said subsidiary power supply and accelerates discharging thereof when said temperature margin degree of said voltage converter is smaller than said temperature margin degree of said subsidiary power supply.

7. An electrical power supply unit for a vehicle according to claim 6, characterized in that said electrical power supply unit comprises:

an actuator current detection means for detecting the drive current of said electrical actuator, and
a converted current detection means for detecting the output current of said voltage converter:
in case where said detected balance between the heat generation conditions is within a preset allowable balance range, said current control means sets a target output current of said voltage converter at a first current, and,
in case where said detected balance between the heat generation conditions is out of said allowable balance range and the temperature margin degree of said subsidiary power supply is smaller than the temperature margin degree of said voltage converter, said current control means sets the target output current of said voltage converter at the same value as a drive current value of said electrical actuator when said drive current falls between a second current, which is larger than said first current, and a third current, which is smaller than said first current, and sets the target output current of said voltage converter at said second current when said drive current value is larger than said second current, and sets the target output current of said voltage converter at said third current when said drive current value is smaller than said third current, and
in case where said detected balance between the heat generation conditions is out of said allowable balance range and the temperature margin degree of said voltage converter is smaller than the temperature margin degree of said subsidiary power supply, said current control means sets the target output current of said voltage converter at a fourth current, which is smaller than said first current, and;
said current control means adjusts the converted voltage of said voltage converter so that said detected output current of the voltage converter is equal to said set target output current of the voltage converter.

8. An electrical power supply unit for a vehicle according to claim 1 to or claim 2, characterized in that said overheat prevention means decreases the upper limit current, which is the upper limit of the drive current of said electrical actuator in accordance with the increase in the detected temperature when one of the detected temperatures of said voltage converter and said subsidiary power supply exceeds an overheat prevention temperature.

9. An electrical power supply unit for a vehicle according to claim 1 to claim 2, characterized in that said electrical actuator is an electrical motor to impart steering force to wheels in accordance with a steering operation by a driver.

* * * * *